US009866400B2

(12) United States Patent
Riley et al.

(10) Patent No.: US 9,866,400 B2
(45) Date of Patent: Jan. 9, 2018

(54) ACTION(S) BASED ON AUTOMATIC PARTICIPANT IDENTIFICATION

(71) Applicant: Microsoft Technology Licensing, LLC, Redmond, WA (US)

(72) Inventors: Raymond Walter Riley, Bainbridge Island, WA (US); Kae-Ling Gurr, Seattle, WA (US); Brett Delainey Christie, Seattle, WA (US); Joshua D. Maruska, Seattle, WA (US); Joshua Noble, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/071,157

(22) Filed: Mar. 15, 2016

(65) Prior Publication Data

US 2017/0272263 A1  Sep. 21, 2017

(51) Int. Cl.
| H04N 7/15 | (2006.01) |
| H04L 12/18 | (2006.01) |
| H04N 7/14 | (2006.01) |
| G06K 9/00 | (2006.01) |

(52) U.S. Cl.
CPC ............ *H04L 12/1822* (2013.01); *H04N 7/15* (2013.01); *G06K 9/00885* (2013.01); *H04N 7/142* (2013.01)

(58) Field of Classification Search
CPC ............ H04N 7/15; H04N 7/152; H04N 7/14; H04N 7/147
USPC ............................................. 348/14.01–14.16
See application file for complete search history.

(56) References Cited

U.S. PATENT DOCUMENTS

| 6,938,069 | B1 | 8/2005 | Narayanaswamy |
| 7,852,369 | B2 | 12/2010 | Cutler et al. |
| 8,050,917 | B2 | 11/2011 | Caspi et al. |
| 8,270,320 | B2 | 9/2012 | Boyer et al. |
| 8,537,196 | B2 | 9/2013 | Hegde et al. |
| 8,572,183 | B2 | 10/2013 | Sharma et al. |
| 8,890,926 | B2 | 11/2014 | Tandon et al. |
| 9,106,657 | B2 | 8/2015 | Albouyeh et al. |
| 2003/0220971 | A1 | 11/2003 | Kressin |
| 2004/0008423 | A1 | 1/2004 | Driscoll, Jr. et al. |
| 2004/0263636 | A1 | 12/2004 | Cutler et al. |

(Continued)

FOREIGN PATENT DOCUMENTS

WO    2015022122 A1    2/2015

OTHER PUBLICATIONS

"Live Meetings", Published on: Feb. 27, 2009, 2 pages, Available at: http://www.teletogether.com/english/web_conference/web_c03.html.

(Continued)

*Primary Examiner* — Melur Ramakrishnaiah
(74) *Attorney, Agent, or Firm* — Wade IP Law LLC

(57) ABSTRACT

Techniques are described herein that are capable of performing action(s) based on automatic participant identification. For example, participants of a meeting may be automatically identified independently from an invitee list for the meeting. In another example, participants of the meeting may be automatically identified even if such participants are not indicated by the invitee list. An action is performed with regard to the participants of the meeting based at least in part on the participants being automatically identified.

20 Claims, 10 Drawing Sheets

(56) References Cited

U.S. PATENT DOCUMENTS

| | | | |
|---|---|---|---|
| 2007/0188598 A1* | 8/2007 | Kenoyer | H04N 7/15 348/14.08 |
| 2008/0097817 A1 | 4/2008 | Solaru | |
| 2009/0046139 A1* | 2/2009 | Cutler | H04N 7/15 348/14.08 |
| 2009/0210491 A1 | 8/2009 | Thakkar et al. | |
| 2010/0040217 A1 | 2/2010 | Aberg et al. | |
| 2010/0177880 A1 | 7/2010 | Danielsen | |
| 2010/0315483 A1 | 12/2010 | King | |
| 2011/0043602 A1 | 2/2011 | Lee | |
| 2012/0075407 A1 | 3/2012 | Wessling | |
| 2012/0081503 A1* | 4/2012 | Leow | H04N 7/142 348/14.07 |
| 2012/0154513 A1 | 6/2012 | Su | |
| 2012/0176467 A1* | 7/2012 | Kenoyer | H04L 29/06027 348/14.08 |
| 2013/0063548 A1* | 3/2013 | Rosenberg | H04N 7/15 348/14.09 |
| 2013/0237240 A1 | 9/2013 | Krantz et al. | |
| 2013/0238729 A1* | 9/2013 | Holzman | H04L 51/066 709/206 |
| 2013/0305337 A1* | 11/2013 | Newman | H04L 12/1818 726/7 |
| 2014/0040928 A1 | 2/2014 | Thies et al. | |
| 2014/0152757 A1* | 6/2014 | Malegaonkar | H04N 7/147 348/14.01 |
| 2014/0278745 A1 | 9/2014 | Herring et al. | |
| 2014/0362979 A1 | 12/2014 | Kaplan et al. | |
| 2015/0110259 A1 | 4/2015 | Kaye et al. | |
| 2015/0111551 A1 | 4/2015 | Kaye et al. | |
| 2015/0189233 A1* | 7/2015 | Carpenter | H04N 7/15 348/14.08 |

OTHER PUBLICATIONS

"Polycom CX 5000", Published on: Apr. 24, 2011, 2 pages, Available at: http://www.communiqueconferencing.com/polycom_cx5000.asp.

"International Search Report and Written Opinion Issued in PCT Application No. PCT/US17/021229", dated Jul. 7, 2017, 18 Pages.

* cited by examiner

ACTION(S) BASED ON AUTOMATIC PARTICIPANT IDENTIFICATION

BACKGROUND 360-degree video systems have become increasingly popular in recent years. A 360-degree video system includes a 360-degree video camera that captures a 360-degree image of an environment. The 360-degree video system may provide access to the 360-degree image through the Internet for display on remote viewers' personal computers, for example.

One example type of environment in which 360-degree video systems have been used is a video conferencing environment. For instance, a 360-degree video system may be incorporated into a video conferencing system, which enables participants of a video conference who are at different locations to communicate using two-way video and audio transmissions. The video conference may be hosted by participants in a conference room (a.k.a. in-room participants) in which a 360-degree video camera is located, and the video conferencing system may enable the in-room participants to communicate in real-time with other participants (e.g., remote participants) who are not in the conference room. The 360-degree video camera captures images of the in-room participants, which may be shown on displays of the other participants' computers to facilitate communication between the in-room participants and the other participants.

It may be desirable to identify one or more participants of a meeting. Some conventional 360-degree video systems allow in-room participants who are indicated by an invitee list for the meeting to be identified based on those in-room participants being indicated by the invitee list. An invitee list for a meeting indicates people who are invited to the meeting. The invitee list need not necessarily be included in a single document or file. For example, the in-room participants may have name tags that are placed on a table in front of them. Such name tags constitute an invitee list because the name tags indicate that those participants are invited to the meeting.

SUMMARY

Various approaches are described herein for, among other things, performing action(s) based on automatic participant identification. For example, participants of a meeting may be automatically identified independently from an invitee list for the meeting. In another example, participants of the meeting may be automatically identified even if such participants are not indicated by the invitee list.

In a first example approach, participants of a meeting are automatically identified in a 360-degree view of an environment that is captured by a 360-degree video camera independently from an invitee list for the meeting. The invitee list indicates people who are invited to the meeting. An action is performed with regard to the participants of the meeting based at least in part on the participants being automatically identified independently from the invitee list.

In a second example approach, participants of a meeting include a designated participant. It is recognized that the designated participant is not indicated by an invitee list for the meeting. The invitee list indicates people who are invited to the meeting. The participants of the meeting are automatically identified in a 360-degree view of an environment that is captured by a 360-degree video camera. Automatically identifying the participants includes comparing an image of the designated participant in the 360-degree view to identification information regarding the designated participant that is stored in a store to automatically identify the designated participant. An action is performed with regard to the participants of the meeting, including the designated participant, based at least in part on the participants being automatically identified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
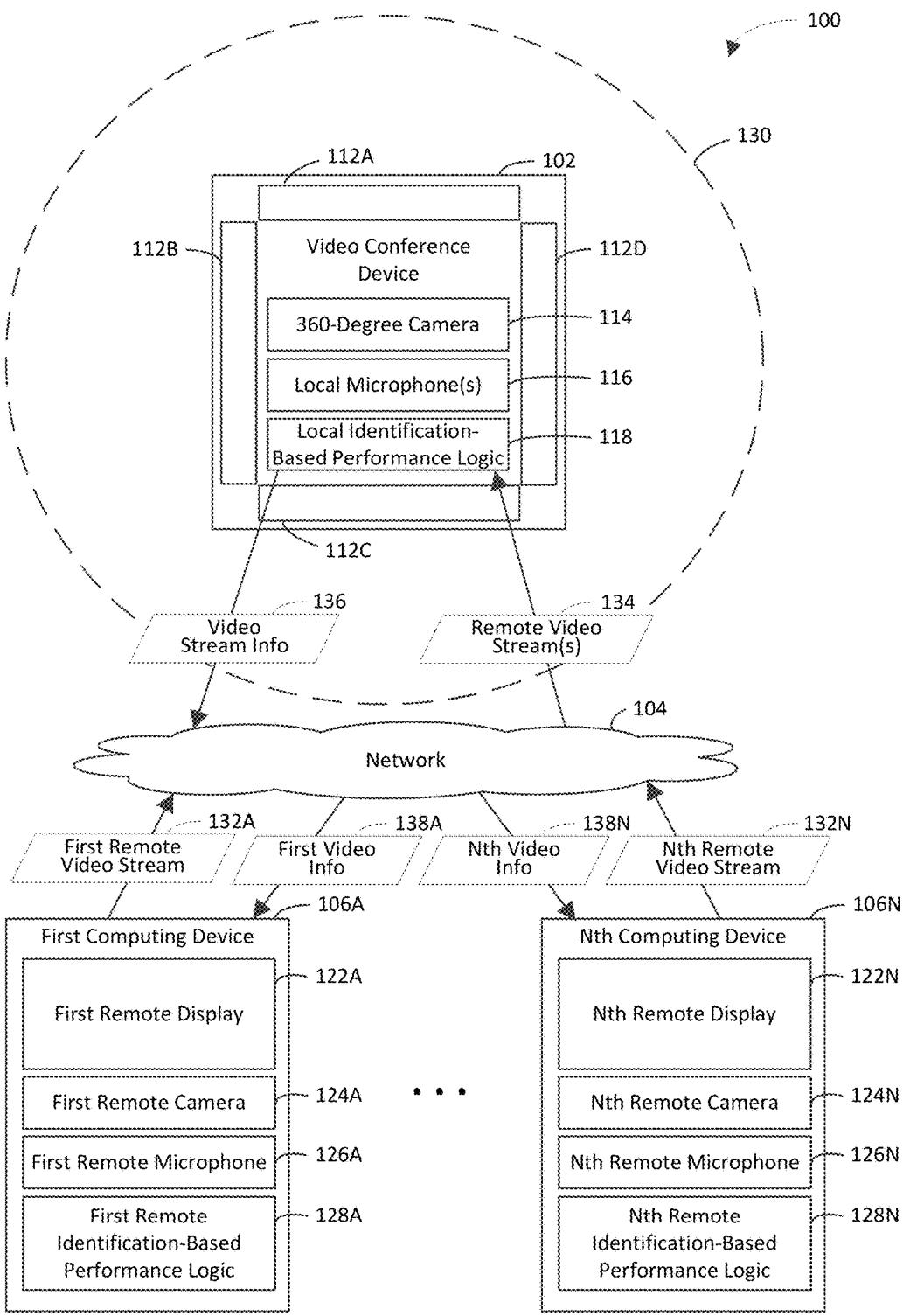
FIG. 1 is a block diagram of an example identification-based performance system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of performing action(s) based on automatic participant identification. For example, participants of a meeting may be automatically identified independently from an invitee list for the meeting. In another example, participants of the meeting may be automatically identified even if such participants are not indicated by the invitee list.

Example techniques described herein have a variety of benefits as compared to conventional techniques for identifying participants of a meeting. For instance, the example techniques may increase user efficiency in any of a variety of ways, including but not limited to increasing an ability of a viewer to identify persons shown in a 360-degree view (e.g., speakers in a video conference and participants to whom the speakers speak), to obtain information about such persons, to send information (e.g., a message or a recording of the meeting) to persons shown in the 360-degree view, etc. The example techniques may reduce an amount of time and/or resources (e.g., processor, memory, network bandwidth) that are consumed to identify participants of a meeting and/or to perform an action with regard to the participants.

FIG. 1 is a block diagram of an example identification-based performance system 100 in accordance with an embodiment. Generally speaking, identification-based performance system 100 operates to perform action(s) based on automatic participant identification. As shown in FIG. 1, identification-based performance system 100 includes a video conference device 102, a network 104, and a plurality of computing devices 106A-106N. Communication among video conference device 102 and computing devices 106A-106N is carried out over network 104 using well-known network communication protocols. Network 104 may be a wide-area network (e.g., the Internet), a local area network (LAN), another type of network, or a combination thereof.

Video conference device 102 is a processing system that is capable of communicating with computing devices 106A-106N. An example of a processing system is a system that includes at least one processor that is capable of manipulating data in accordance with a set of instructions. For instance, a processing system may be a computer, a game console, a personal digital assistant, etc. Video conference device 102 also may be referred to as a computing device. Video conference device 102 is configured to facilitate communication among participants of a video conference. Video conference device 102 includes displays 112A-112D, a 360-degree camera 114, local microphone(s) 116, and local identification-based performance logic 118.

360-degree camera 114 is configured to capture a 360-degree view, which includes participants of the video conference who are within a field of view 130 of 360-degree camera 114. The participants of the video conference who are within the field of view 130 are referred to herein as "local participants" for illustrative purposes and are not intended to be limiting. For instance, the local participants may be in a conference room. In one example, the field of view 130 may extend a designated (e.g., pre-determined) radius from 360-degree camera 114. In another example, the field of view 130 may extend to the walls of a room in which the local participants are located. 360-degree camera 114 is further configured to generate a 360-degree video stream based on the 360-degree view that is captured by 360-degree camera 114.

Local microphone(s) 116 are configured to receive speech of the local participants and other sounds that are audible to a human (e.g., frequencies in a range of 20 Hertz to 20,000 Hertz).

Local identification-based performance logic 118 is configured to perform one or more of the operations described herein to perform action(s) based on automatic participant identification. For instance, local identification-based performance logic 118 may analyze the 360-degree view that is captured by 360-degree camera 114 to automatically identify the participants of the video conference who are within the field of view 130 of 360-degree camera 114. For example, local identification-based performance logic 118 may automatically identify the participants independently from an invitee list for the video conference. In another example, local identification-based performance logic 118 may automatically identify the participants even if the participants are not indicated by the invitee list. Local identification-based performance logic 118 may perform the action(s) with regard to the participants based at least in part on the participants being automatically identified.

Local identification-based performance logic 118 may receive remote video stream(s) 134 from one or more of computing devices 106A-106N. The remote video stream(s) 134 may include any one or more of the remote video streams 132A-132N from respective computing devices 106A-106N. The remote video streams 132A-132N are described in further detail below. Local identification-based performance logic 118 may analyze the remote video stream(s) 134 to automatically identify one or more remote participants who are associated with the one or more of the computing devices 106A-106N from which the video stream(s) 134 are received. The participants who are associated with computing devices 106A-106N are not within the field of view 130 of 360-degree camera 114. The participants who are associated with computing devices 106A-106N are referred to herein as "remote participants" for illustrative purposes and are not intended to be limiting.

Local identification-based performance logic 118 may generate video stream information 136 based on the remote video stream(s) 134 and/or at least a portion of the 360-degree video stream. Video stream information 136 may include video information 138A-138N for respective computing devices 106A-106N. For example, each of the video information 138A-138N may include a respective combination of one or more of the remote video stream(s) 134 and/or at least a portion of the 360-degree video stream. Each of the combinations may be the same as or different from any one or more others of the combinations.

Computing devices 106A-106N are processing systems that are capable of communicating with video conference device 102. Computing devices 106A-106N include respective remote displays 122A-122N, remote cameras 124A-124N, remote microphones 126A-126N, and remote identification-based performance logic 128A-128N.

Remote displays 122A-122N are configured to display respective combinations of one or more of the remote video stream(s) 134 and/or at least a portion of the 360-degree video stream. Any one or more of the combinations may be different from other(s) of the combinations. Any two or more of the combinations may be the same.

Remote cameras 124A-124N are configured to capture views of respective remote participants. For example, first remote camera 124A may be configured to capture a first remote participant who owns or otherwise has access to first computing device 106A. In another example, Nth remote camera 124N may be configured to capture an Nth remote participant who owns or otherwise has access to Nth computing device 106N. Remote cameras 124A-124N are further configured to generate respective remote video streams 132A-132N.

Remote microphones 126A-126N are configured to receive speech of the respective remote participants and other sounds that are audible to a human.

Remote identification-based performance logic 128A-128N are configured to perform one or more of the operations described herein to perform action(s) based on automatic participant identification. For example, each of the video information 138A-138N may include at least a portion of the 360-degree video stream and/or one or more of the remote video stream(s) 134. In accordance with this example, remote identification-based performance logic 128A-128N may analyze the respective video information 138A-138N to automatically identify the participants of the video conference who are shown in the video stream(s) therein. When local participants are automatically identified in the 360-degree video stream (e.g., a portion thereof), those local participants are said to be automatically identified in the 360-degree view on which the 360-degree video stream is based.

In further accordance with this example, each of the remote identification-based performance logic 128A-128N may perform the action(s) with regard to one or more of the participants based at least in part on the respective one or more of the participants being automatically identified. In an aspect, remote identification-based performance logic 128A-128N may perform the action(s) with regard to the respective remote participants who are who are associated with respective computing devices 106A-106N. In accordance with this aspect, local identification-based performance logic 118 may perform the action(s) with regard to the local participants of the video conference.

Computing devices 106A-106N may include any client-enabled system or device, including but not limited to a desktop computer, a laptop computer, a tablet computer, a personal digital assistant, a cellular telephone, a wearable device, or the like.

Example techniques for performing action(s) based on automatic participant identification are discussed in greater detail below with reference to FIGS. 2-9.

Local identification-based performance logic 118 and/or any of remote identification-based performance logic 128A-128N may be implemented in various ways to perform action(s) based on automatic participant identification, including being implemented in hardware, software, firmware, or any combination thereof. For example, local identification-based performance logic 118 and/or any of remote identification-based performance logic 128A-128N may be implemented as computer program code configured to be executed in one or more processors. In another example, local identification-based performance logic 118 and/or any of remote identification-based performance logic 128A-128N may be implemented as hardware logic/electrical circuitry. For instance, local identification-based performance logic 118 and/or any of remote identification-based performance logic 128A-128N may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
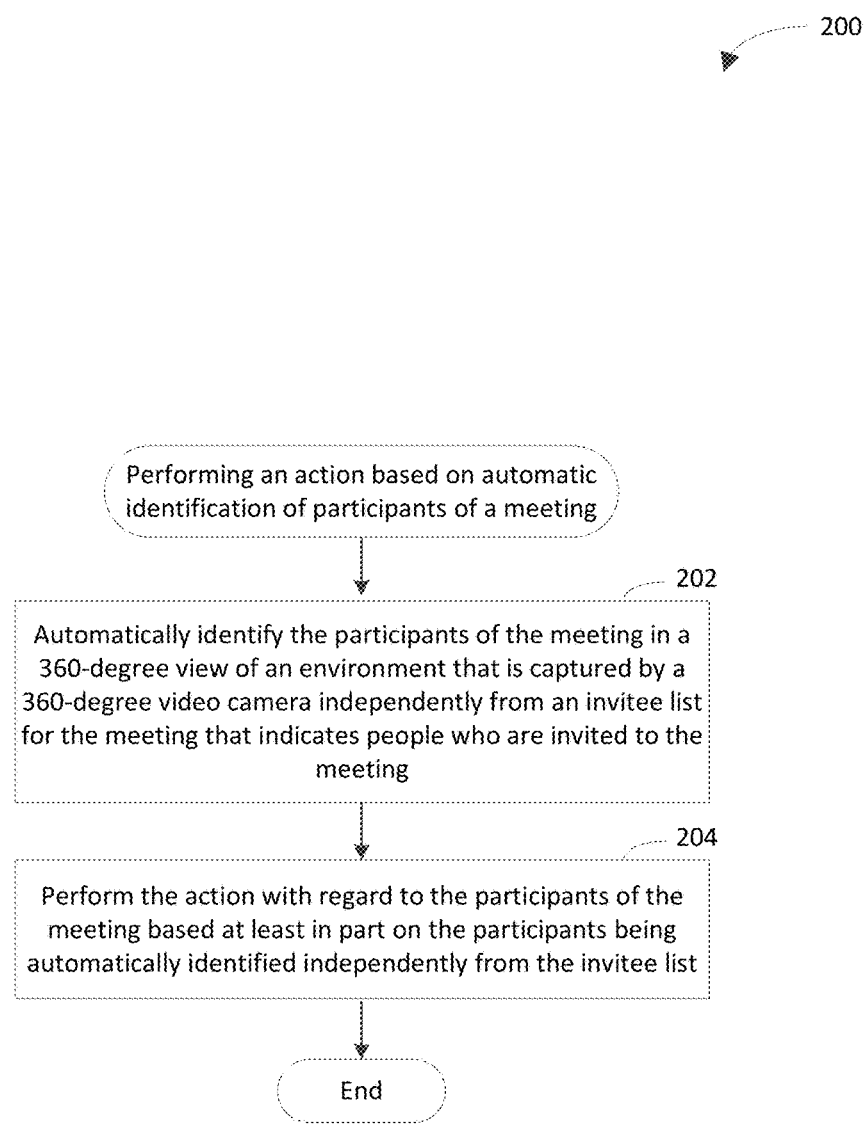
FIGS. 2-4 and 6-8 depict flowcharts of example methods for performing an action based on automatic identification of participants of a meeting in accordance with embodiments
Figure 3:
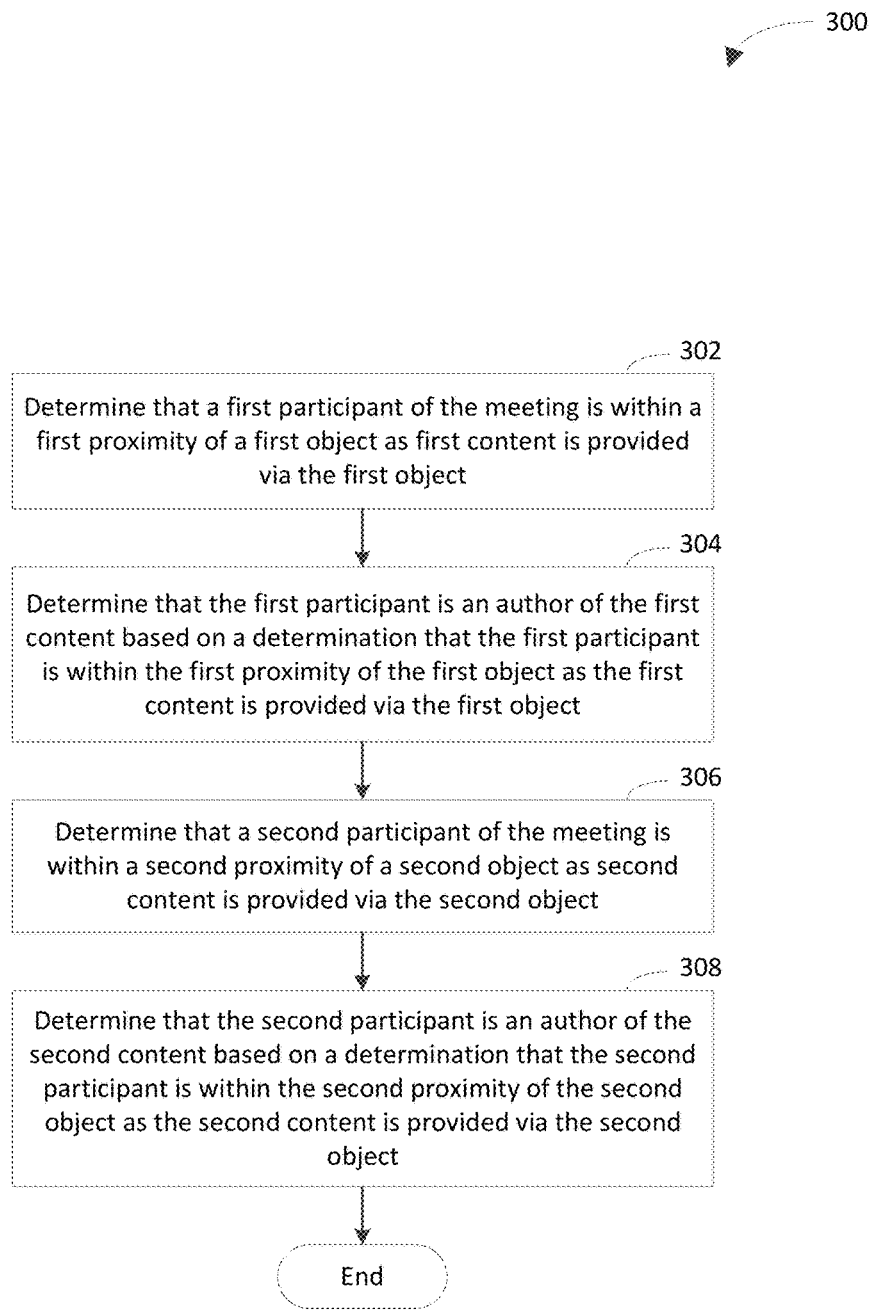
Figure 4:
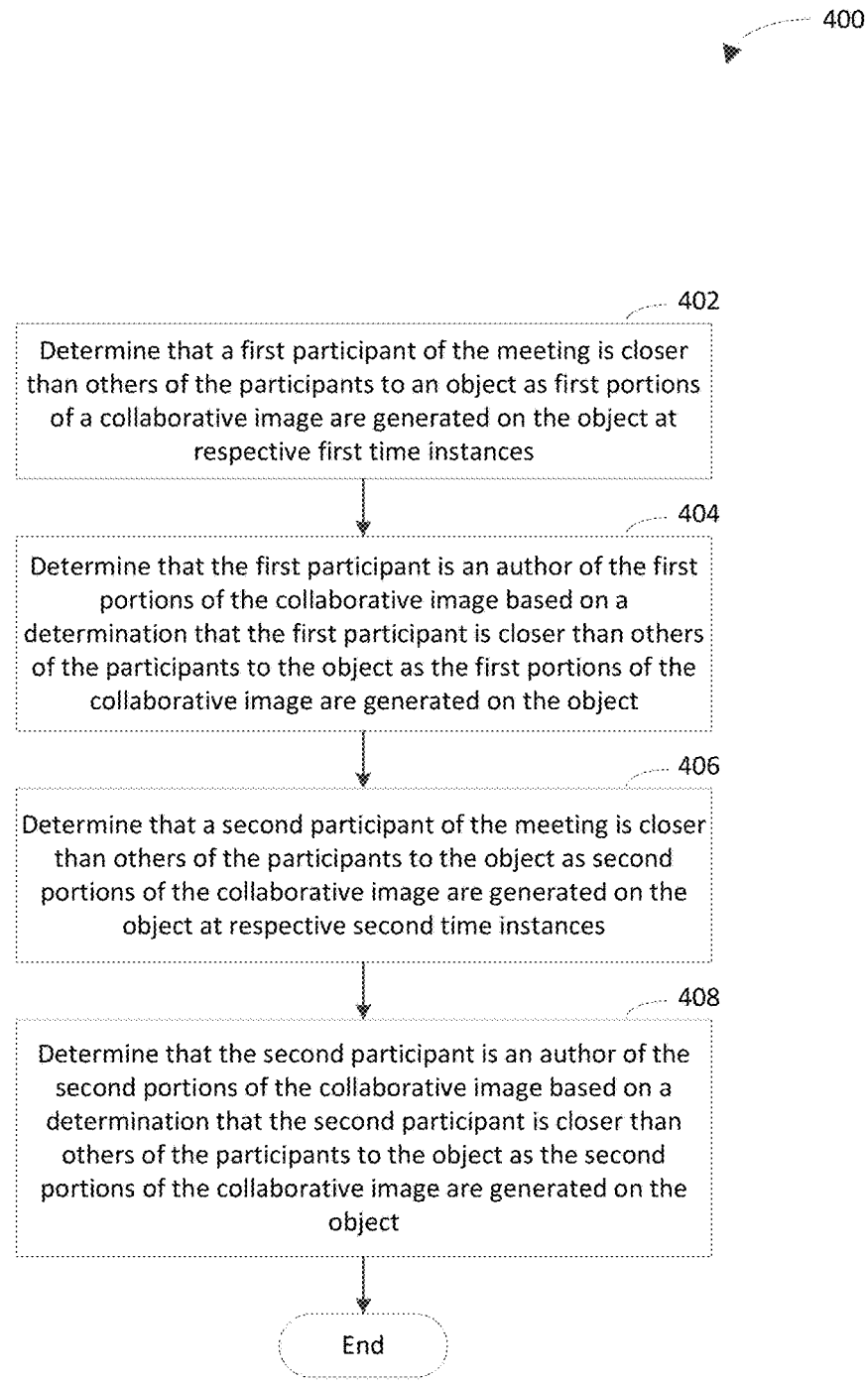
Figure 5:
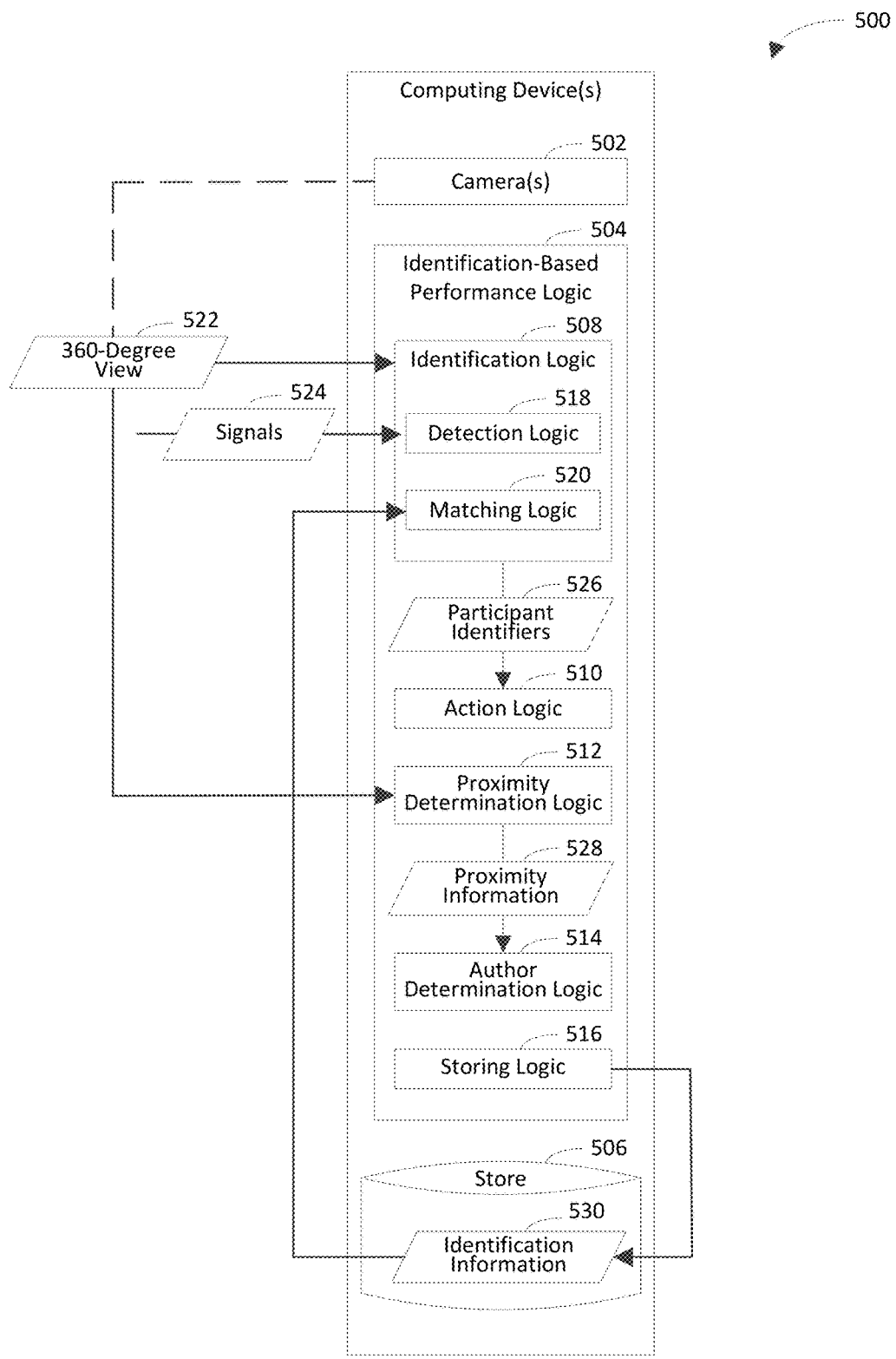
FIGS. 5 and 9 are block diagrams of example computing devices in accordance with embodiments.

FIGS. 2-4 depict flowcharts 200, 300, and 400 of example methods for performing an action based on automatic identification of participants of a meeting in accordance with embodiments. Flowcharts 200, 300, and 400 may be performed by video conference device 102 and/or any one or more of computing devices 106A-106N shown in FIG. 1, for example. For illustrative purposes, flowcharts 200, 300, and 400 are described with respect to computing device(s) 500 shown in FIG. 5. For instance, computing device(s) 500 may be an example implementation of video conference device 102 and/or any one or more of computing devices 106A-106N shown in FIG. 1. As shown in FIG. 5, computing device(s) 500 include camera(s) 502, identification-based performance logic 504, and a store 506. Identification-based performance logic 504 includes identification logic 508, action logic 510, proximity determination logic 512, author determination logic 514, and storing logic 516. Identification logic 508 includes detection logic 518 and matching logic 520. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, the participants of the meeting are automatically identified (e.g., recognized) in a 360-degree view of an environment that is captured by a 360-degree video camera independently from (e.g., without regard to) an invitee list for the meeting that indicates people who are invited to the meeting. For instance, the invitee list may specify which people from a corpus of people are invited to the meeting. The invitee list may indicate all of the people who are invited to the meeting or a subset (i.e., less than all) of the people who are invited to the meeting. The invitee list may indicate each person who is invited to the meeting.

The participants of the meeting may be automatically identified using any suitable technique, including but not limited to a biometric technique. A biometric technique is a technique that uses biometric identifier(s) to identify a human. A biometric identifier is a detectable and/or measurable characteristic of a human body. A biometric identifier of a person may distinguish the person from other people. For instance, a biometric identifier of a person may uniquely identify the person. Examples of a biometric identifier include but are not limited to a fingerprint, a face, DNA, palm veins, palm print, hand geometry, an iris, a retina, a voice, and a scent (e.g., an odor). For example, facial recognition is a biometric technique that uses a face of a person to identify the person. In another example, iris recognition is a biometric technique that uses an iris of a person to identify the person.

In an example implementation, identification logic 508 identifies the participants of the meeting in a 360-degree view 522 of the environment that is captured by the 360-degree video camera independently from the invitee list. The 360-degree video camera may be included in camera(s) 502, though the scope of the example embodiments is not limited in this respect. For instance, camera(s) 502 need not necessarily capture the 360-degree view 522, as depicted by the dashed line leading from camera(s) 502 in FIG. 5. In accordance with this implementation, identification logic 508 may generate participant identifiers 526 to identify the respective participants.

In an example embodiment, automatically identifying the participants at step 202 includes detecting signals from respective mobile devices that are associated with the respective participants of the meeting. For example, the signals may uniquely identify the respective participants. In another example, the signals may be unsolicited signals. In accordance with this example, the signals may not be received in response to requests that are provided to the mobile devices. The signals may be transmitted in accordance with a wireless communication protocol, though the scope of the example embodiments is not limited in this respect. Examples of a wireless communication protocol include but are not limited to a Bluetooth® protocol, a Digital Enhanced Cordless Telecommunication (DECT) protocol, a wireless USB protocol, a Wi-Fi (IEEE 802.11) protocol, an Ultra-Wideband (UWB) protocol, and a ZigBee® (IEEE 802.15.4) protocol. In an example implementation, detection logic 518 detects signals 524 from respective mobile devices that are associated with the respective participants of the meeting.

In accordance with this embodiment, automatically identifying the participants at step 202 further includes matching the signals to the respective participants to automatically identify the respective participants. For instance, attributes of the signals may be compared to identifiers associated with the respective participants and/or the mobile devices that are associated with the respective participants to match the signals to the respective participants. Examples of an attribute include but are not limited to a frequency, an amplitude, a phase, a modulation (e.g., frequency modulation, amplitude modulation, or phase modulation), and encoding. For instance, a first participant of the meeting may be associated with a first signal having a first frequency, a first amplitude, a first phase, a first modulation scheme, etc. A second participant of the meeting may be associated with a second signal having a second frequency, a second amplitude, a second phase, a second modulation scheme, etc., and so on.

In an example implementation, matching logic matches the signals 524 to the respective participants to automatically identify the respective participants. For example, store 506 may store identification information 530. Identification information 530 may include identifiers that correspond to the respective signals 524. In accordance with this example, matching logic 520 may cross-reference the identifiers with the signals 524 to automatically identify the respective participants.

It will be recognized that store 506 may be any suitable type of store. One type of store is a database. For instance, store 506 may be a relational database, an entity-relationship database, an object database, an object relational database, an extensible markup language (XML) database, etc.

At step 204, the action is performed with regard to the participants of the meeting based at least in part on the participants being automatically identified independently from the invitee list. For instance, the action may be performed with regard to each of the participants of the meeting based at least in part on each of the participants being automatically identified independently from the invitee list. In an example implementation, action logic 510 performs the action with regard to the participants. For example, action logic 510 may perform the action in response to (e.g., based on) receipt of the participant identifiers 526. In accordance with this example, action logic 510 may determine the participants with regard to whom the action is to be performed based on the participant identifiers 526.

In an example embodiment, performing the action at step 204 includes sending a message to the participants of the meeting based at least in part on the participants being automatically identified. Examples of a message include but are not limited to an email, a short message service (SMS) message, and an instant message (IM). For instance, the message may include a questionnaire, a slide show to be discussed at the meeting, an outline of topics to be discussed at the meeting, a list of presenters who are to speak at the meeting, action items regarding subject matter that was discussed at the meeting, etc. The message may be sent at initiation of the meeting, during the meeting, or following the meeting.

In another example embodiment, performing the action at step 204 includes sending a recording of the meeting to the participants of the meeting based at least in part on the participants being automatically identified. For instance, the recording may include an audio recording and/or a video recording.

In some example embodiments, one or more steps 202 and/or 204 of flowchart 200 may not be performed. Moreover, steps in addition to or in lieu of steps 202 and/or 204 may be performed. For instance, in an example embodiment, the method of flowchart 200 further includes storing identification information in a store (e.g., a database). The identification information identifies and/or describes first biometric identifier(s) of each of a plurality of people. The plurality of people includes the participants of the meeting. In an example implementation, store 506 stores identification information 530. In accordance with this implementation, the identification information 350 identifies and/or describes the first biometric identifier(s) of each of the plurality of people.

In accordance with this embodiment, automatically identifying the participants at step 202 includes detecting second biometric identifier(s) of each participant of the meeting. In an example implementation, detection logic 518 detects the second biometric identifier(s) of each participant of the meeting. For example, detection logic 518 may include sensor(s) that are configured to detect the second biometric identifier(s) of each participant of the meeting. In another example, detection logic 518 may receive the second biometric identifier(s) of each participant of the meeting from sensor(s) that are external to detection logic 518 or from transmitter(s) that are directly or indirectly coupled to the sensor(s).

In further accordance with this embodiment, automatically identifying the participants at step 202 further includes matching the first biometric identifier(s) of each participant that is detected in the 360-degree view to the second biometric identifier(s) of the respective participant to automatically identify the respective participant. In an example implementation, matching logic 520 matches the first biometric identifier(s) of each participant that is detected in the 360-degree view 522 to the second biometric identifier(s) of the respective participant to automatically identify the respective participant.

In an aspect of this example embodiment, the identification information describes facial features of the people. In accordance with this aspect, automatically identifying the participants at step 202 includes detecting facial features of each participant of the meeting in the 360-degree view of the environment. In further accordance with this aspect, automatically identifying the participants at step 202 further includes matching the facial features of each participant that is detected in the 360-degree view to the identification information that describes the facial features of the respective participant to automatically identify the respective participant.

In another aspect, the identification information includes a fingerprint of each of the people. In accordance with this aspect, automatically identifying the participants at step 202 includes receiving fingerprints that are captured by cameras included in respective mobile devices of the respective participants at initiation of the meeting. In further accordance with this aspect, automatically identifying the participants at step 202 further includes matching the fingerprints of the participants that are stored in the store with the fingerprints that are captured by the cameras included in the respective mobile devices of the respective participants to automatically identify the respective participants.

In yet another aspect, the identification information includes an eye scan of each of the people. An eye scan of a person is a scan of an eye of the person. In accordance with this aspect, automatically identifying the participants at step 202 includes receiving eye scans that are captured by cameras included in respective mobile devices of the respective participants at initiation of the meeting. In further accordance with this aspect, automatically identifying the participants at step 202 further includes matching the eye scans of the participants that are stored in the store with the eye scans that are captured by the cameras included in the respective mobile devices of the respective participants to automatically identify the respective participants.

In still another aspect, the identification information includes an electrocardiogram of each of the people. An electrocardiogram of a person indicates activity of a heart of the person. In accordance with this aspect, automatically identifying the participants at step 202 includes receiving electrocardiograms that are captured by sensors included in respective mobile devices of the respective participants at initiation of the meeting. In further accordance with this aspect, automatically identifying the participants at step 202 further includes matching the electrocardiograms of the participants that are stored in the store with the electrocardiograms that are captured by the sensors included in the respective mobile devices of the respective participants to automatically identify the respective participants.

In another example embodiment, automatically identifying the participants at step 202 includes automatically identifying a first participant of the meeting and a second participant of the meeting. In an aspect of this embodiment, the method of flowchart 200 further includes one or more of the steps shown in flowchart 300 of FIG. 3.

As shown in FIG. 3, the method of flowchart 300 begins at step 302. In step 302, a determination is made that the first participant is within a first proximity of a first object as first content is provided via the first object (e.g., in response to automatically identifying the first participant). The first proximity may be a fixed proximity (e.g., one foot, six inches) or a variable proximity (e.g., a closer proximity to the first object than the proximities of others of the participants to the first object). In an example implementation, proximity determination logic 512 determines that the first participant is within the first proximity of the first object as the first content is provided via the first object. For instance, proximity determination logic 512 may analyze the 360-degree view 522 to determine that the first participant is within the first proximity of the first object as the first content is provided via the first object. In accordance with this implementation, proximity determination logic 512 may generate first proximity information to indicate that the first participant is within the first proximity of the first object as the first content is provided via the first object. The first proximity information may be included in proximity information 512.

At step 304, a determination is made that the first participant is an author of the first content based on a determination that the first participant is within the first proximity of the first object as the first content is provided via the first object. In an example implementation, author determination logic 514 determines that the first participant is the author of the first content. For example, author determination logic 514 may determine that the first participant is the author of the first content in response to receipt of the first proximity information. In accordance with this example, author determination logic 514 may determine that the first participant is the author of the first content based on the first proximity information indicating that the first participant is within the first proximity of the first object as the first content is provided via the first object.

At step 306, a determination is made that the second participant is within a second proximity of a second object as second content is provided via the second object (e.g., in response to automatically identifying the second participant). The second proximity may be a fixed proximity (e.g., one foot, six inches) or a variable proximity (e.g., a closer proximity to the second object than the proximities of others of the participants to the second object). The first proximity and the second proximity may be same or different. In an example implementation, proximity determination logic 512 determines that the second participant is within the second proximity of the second object as the second content is provided via the second object. For instance, proximity determination logic 512 may analyze the 360-degree view 522 to determine that the second participant is within the second proximity of the second object as the second content is provided via the second object. In accordance with this implementation, proximity determination logic 512 may generate second proximity information to indicate that the second participant is within the second proximity of the second object as the second content is provided via the second object. The second proximity information may be included in proximity information 512.

At step 308, a determination is made that the second participant is an author of the second content based on a determination that the second participant is within the second proximity of the second object as the second content is provided via the second object. In an example implementation, author determination logic 514 determines that the second participant is the author of the second content. For example, author determination logic 514 may determine that the second participant is the author of the second content in response to receipt of the second proximity information. In accordance with this example, author determination logic 514 may determine that the second participant is the author of the second content based on the second proximity information indicating that the second participant is within the second proximity of the second object as the second content is provided via the second object.

Each of the first object and the second object may be any suitable object, including but not limited to a display, and a whiteboard (e.g., a chalkboard). Each of the first content and the second content may be any suitable content, including but not limited to a slideshow (e.g., presented on a display), a drawing (e.g., generated on a touch-enabled display or a whiteboard), and handwriting (e.g., generated on a touch-enabled display or a whiteboard).

In another aspect of this embodiment, the method of flowchart 200 further includes one or more of the steps shown in flowchart 400 of FIG. 4.

As shown in FIG. 4, the method of flowchart 400 begins at step 402. In step 402, a determination is made that the first participant is closer than others of the participants to an object as first portions of a collaborative image are generated on the object at respective first time instances (e.g., in response to automatically identifying the first participant). In an example implementation, proximity determination logic 512 determines that the first participant is closer than others of the participants to the object as the first portions of the collaborative image are generated on the object at the respective first time instances. For instance, proximity determination logic 512 may analyze the 360-degree view 522 to determine that the first participant is closer than others of the participants to the object as the first portions of the collaborative image are generated on the object at the respective first time instances. In accordance with this implementation, proximity determination logic 512 may generate first proximity information to indicate that the first participant is closer than others of the participants to the object as the first portions of the collaborative image are generated on the object at the respective first time instances. The first proximity information may be included in proximity information 528.

At step 404, a determination is made that the first participant is an author of the first portions of the collaborative image based on a determination that the first participant is closer than others of the participants to the object as the first portions of the collaborative image are generated on the object. In an example implementation, author determination logic 514 determines that the first participant is the author of the first portions of the collaborative image. For example, author determination logic 514 may determine that the first participant is the author of the first portions of the collaborative image in response to receipt of the first proximity information. In accordance with this example, author determination logic 514 may determine that the first participant is the author of the first portions of the collaborative image based on the first proximity information indicating that the first participant is closer than others of the participants to the object as the first portions of the collaborative image are generated on the object at the respective first time instances.

At step 406, a determination is made that the second participant is closer than others of the participants to the object as second portions of the collaborative image are generated on the object at respective second time instances (e.g., in response to automatically identifying the second participant). In an example implementation, proximity determination logic 512 determines that the second participant is closer than others of the participants to the object as the second portions of the collaborative image are generated on the object at the respective second time instances. For instance, proximity determination logic 512 may analyze the 360-degree view 522 to determine that the second participant is closer than others of the participants to the object as the second portions of the collaborative image are generated on the object at the respective second time instances. In accordance with this implementation, proximity determination logic 512 may generate second proximity information to indicate that the second participant is closer than others of the participants to the object as the second portions of the collaborative image are generated on the object at the respective second time instances. The second proximity information may be included in proximity information 528.

At step 408, a determination is made that the second participant is an author of the second portions of the collaborative image based on a determination that the second participant is closer than others of the participants to the object as the second portions of the collaborative image are generated on the object. In an example implementation, author determination logic 514 determines that the second participant is the author of the second portions of the collaborative image. For example, author determination logic 514 may determine that the second participant is the author of the second portions of the collaborative image in response to receipt of the second proximity information. In accordance with this example, author determination logic 514 may determine that the second participant is the author of the second portions of the collaborative image based on the second proximity information indicating that the second participant is closer than others of the participants to the object as the second portions of the collaborative image are generated on the object at the respective second time instances.

It will be recognized that computing device(s) 500 may not include one or more of camera(s) 502, identification-based performance logic 504, store 506, identification logic 508, action logic 510, proximity determination logic 512, author determination logic 514, storing logic 516, detection logic 518, and/or matching logic 520. Furthermore, computing device(s) 500 may include components in addition to or in lieu of camera(s) 502, identification-based performance logic 504, store 506, identification logic 508, action logic 510, proximity determination logic 512, author determination logic 514, storing logic 516, detection logic 518, and/or matching logic 520.

Figure 6:
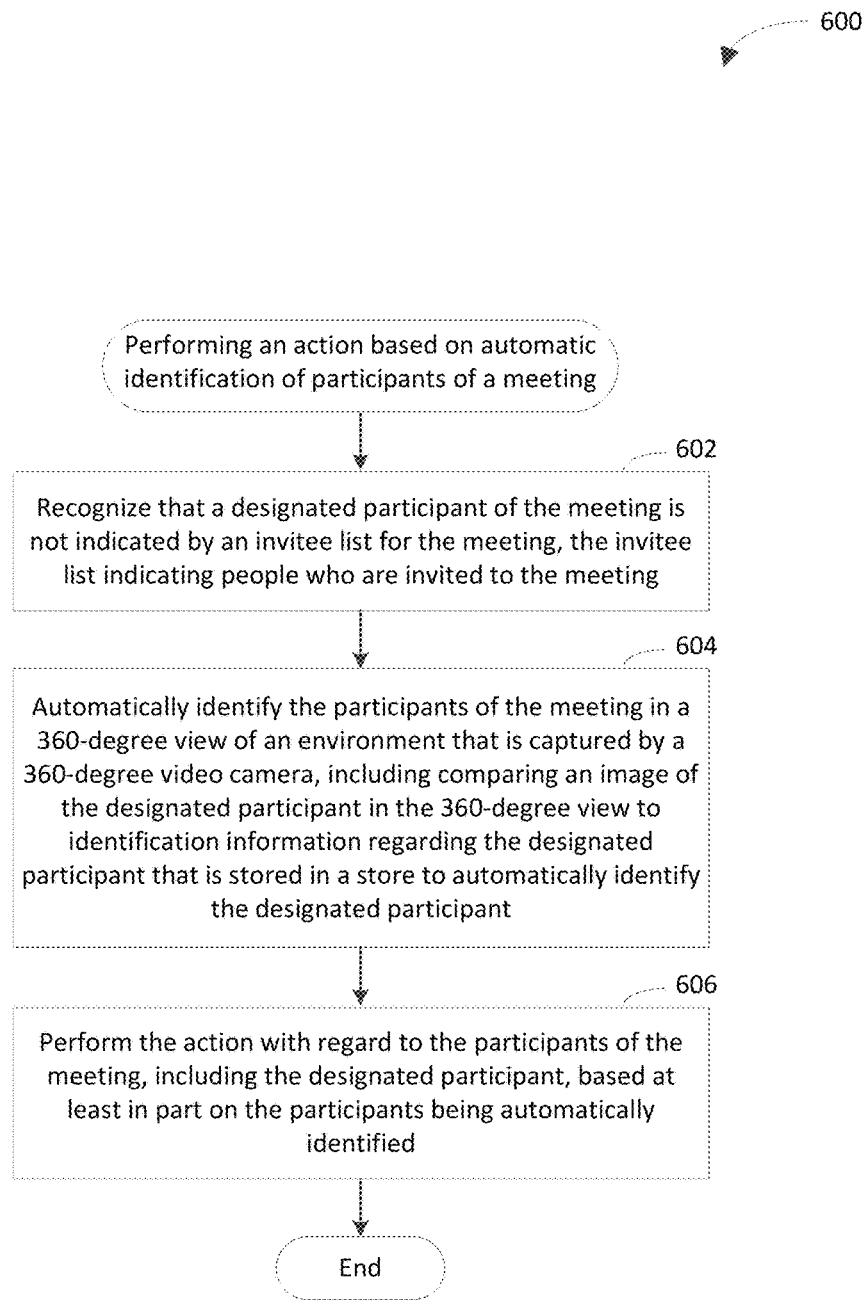
Figure 7:
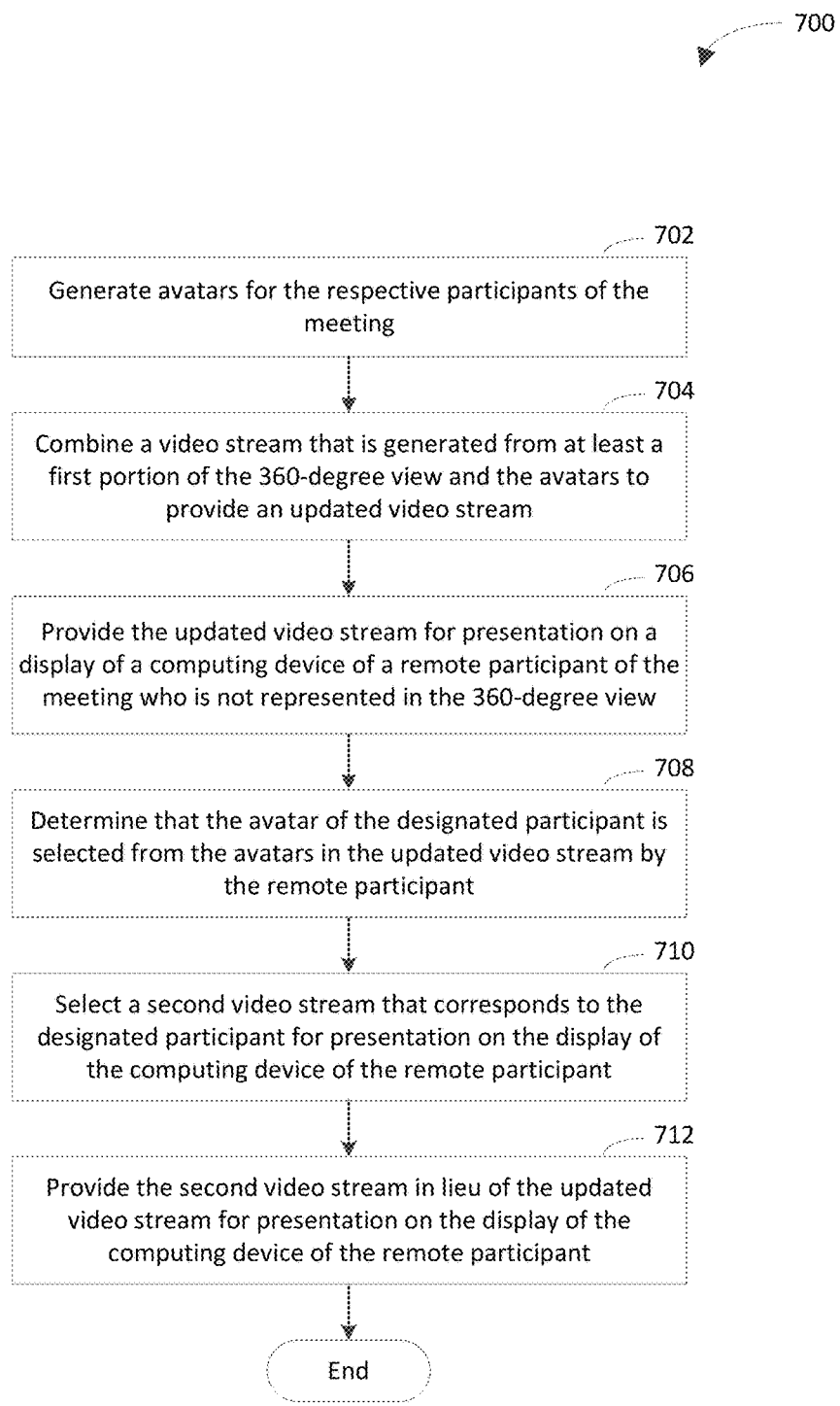
Figure 8:
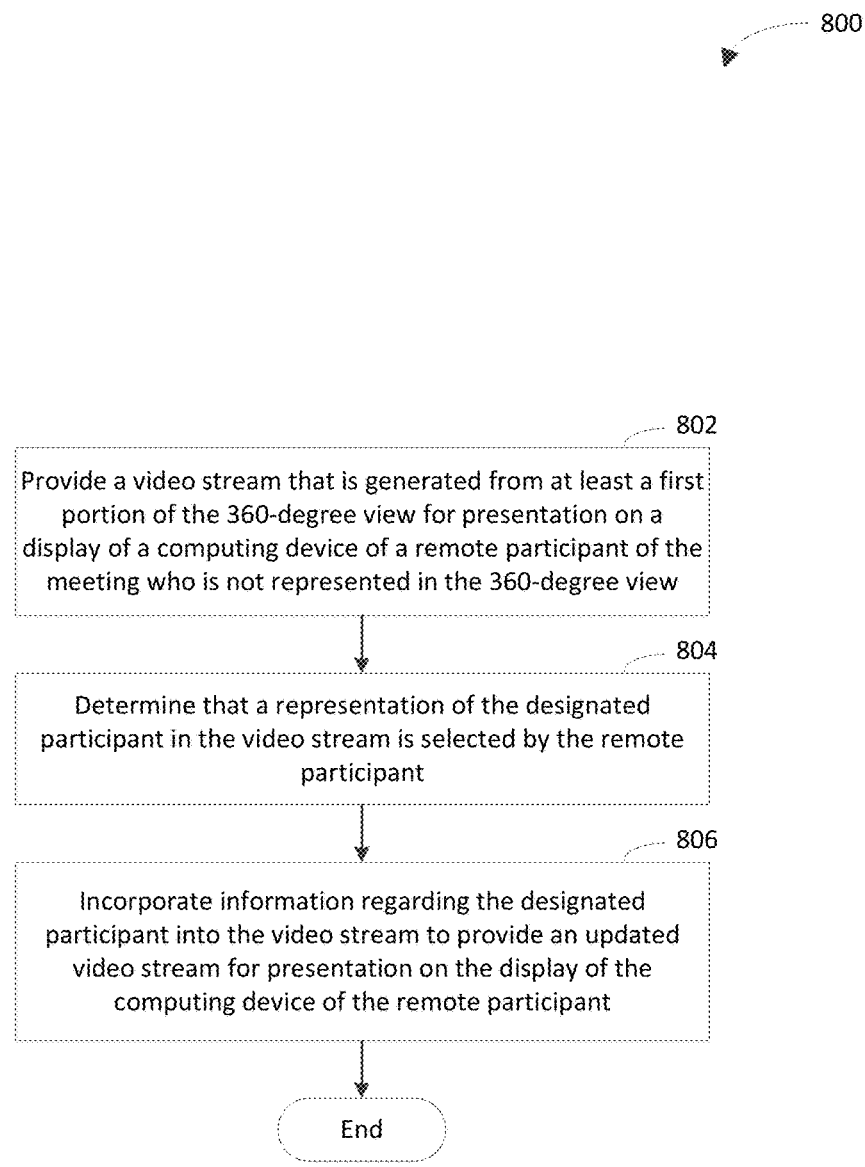
Figure 9:
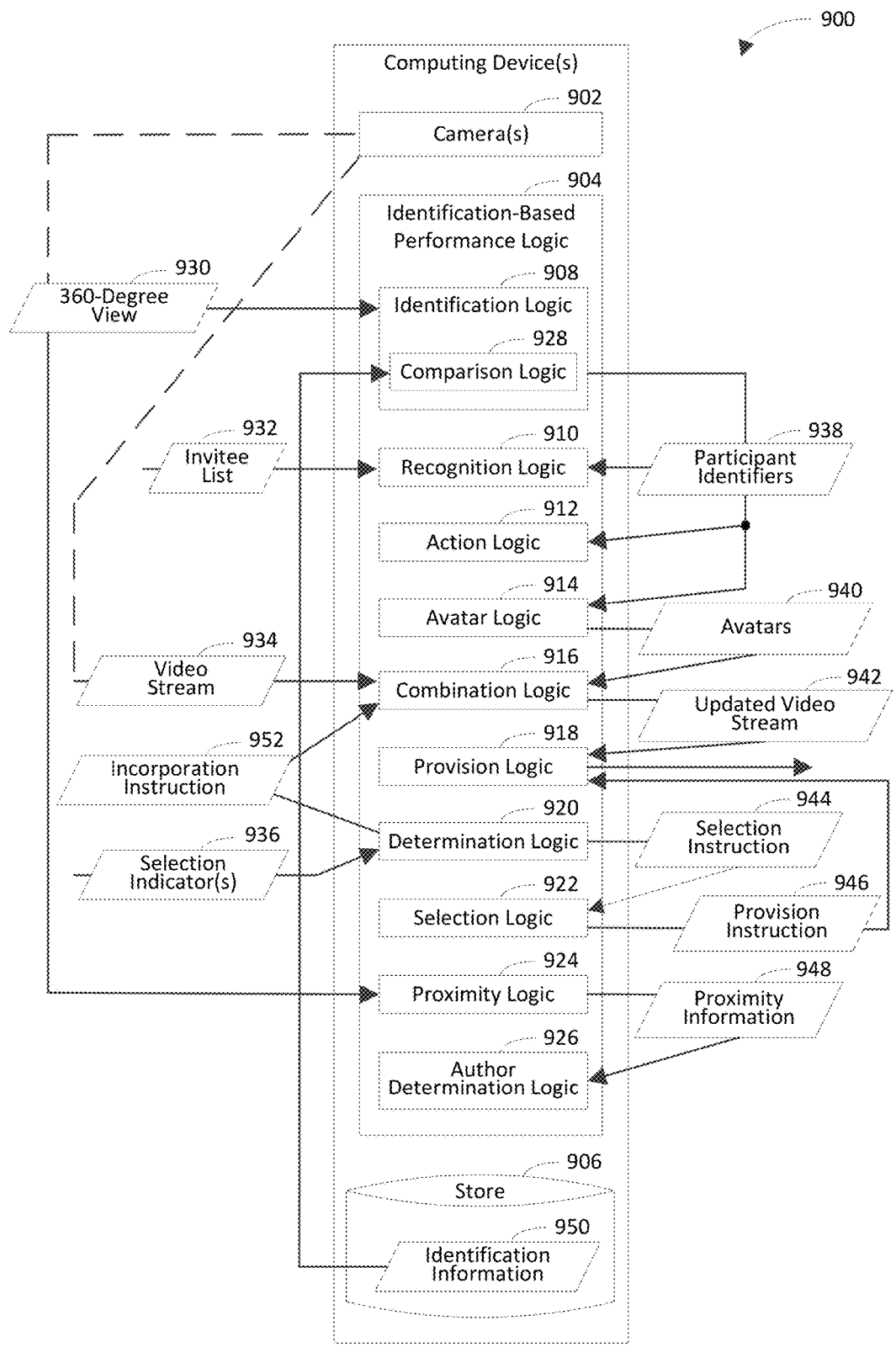

FIGS. 6-8 depict flowcharts 600, 700, and 800 of other example methods for performing an action based on automatic identification of participants of a meeting in accordance with embodiments. Flowcharts 600, 700, and 800 may be performed by video conference device 102 and/or any one or more of computing devices 106A-106N shown in FIG. 1, for example. For illustrative purposes, flowcharts 600, 700, and 800 are described with respect to computing device(s) 900 shown in FIG. 9. For instance, computing device(s) 900 may be an example implementation of video conference device 102 and/or any one or more of computing devices 106A-106N shown in FIG. 1. As shown in FIG. 9, computing device(s) 900 include camera(s) 902, identification-based performance logic 904, and a store 906. Identification-based performance logic 904 includes identification logic 908, recognition logic 910, action logic 912, avatar logic 914, combination logic 916, provision logic 918, determination logic 920, selection logic 922, proximity logic 924, and author determination logic 926. Identification logic 908 includes comparison logic 928. Further structural and operational embodiments will be apparent to persons skilled in the relevant art(s) based on the discussion regarding flowcharts 600, 700, and 800.

As shown in FIG. 6, the method of flowchart 600 begins at step 602. In step 602, it is recognized that a designated participant of the meeting is not indicated by an invitee list for the meeting. The invitee list indicates people who are invited to the meeting. For instance, the invitee list may specify which people from a corpus of people are invited to the meeting. The invitee list may indicate all of the people who are invited to the meeting or a subset (i.e., less than all) of the people who are invited to the meeting. The invitee list may indicate each person who is invited to the meeting. The participants of the meeting may be automatically identified using any suitable technique, including but not limited to a biometric technique. In an example implementation, recognition logic 910 recognizes that the designated participant of the meeting is not indicated by an invitee list 932 for the meeting.

At step 604, the participants of the meeting are automatically identified (e.g., recognized) in a 360-degree view of an environment that is captured by a 360-degree video camera. Automatically identifying the participants in the 360-degree view includes comparing an image of the designated participant in the 360-degree view to identification information regarding the designated participant that is stored (e.g., persisted) in a store (e.g., databased) to automatically identify the designated participant. For instance, comparing the image of the designated participant in the 360-degree view to the identification information regarding the designated participant that is stored in the store may be performed in response to recognizing that the designated participant is not indicated by the invitee list. In an example implementation, identification logic 908 automatically identifies the participants of the meeting in a 360-degree view 930 of an environment that is captured by the 360-degree video camera. The 360-degree video camera may be included in camera(s) 902, though the scope of the example embodiments is not limited in this respect. In accordance with this implementation, store 906 stores identification information 950. In further accordance with this implementation, comparison logic 928 compares the image of the designated participant in the 360-degree view 930 to identification information regarding the designated participant, which is included in the identification information 950, to automatically identify the designated participant. In further accordance with this implementation, identification logic 908 may generate participant identifiers 938 to identify the respective participants.

At step 606, the action is performed with regard to the participants of the meeting, including the designated participant, based at least in part on the participants being automatically identified. For instance, the action may be performed with regard to each of the participants of the meeting based at least in part on each of the participants being automatically identified independently from the invitee list. In an example implementation, action logic 912 performs the action with regard to the participants, including the designated participant. For example, action logic 912 may perform the action in response to (e.g., based on) receipt of the participant identifiers 938. In accordance with this example, action logic 912 may determine the participants with regard to whom the action is to be performed based on the participant identifiers 938.

In an example embodiment, performing the action at step 606 includes sending a message to the participants of the meeting based at least in part on the participants being automatically identified. Examples of a message include but are not limited to an email, a short message service (SMS) message, and an instant message (IM).

In another example embodiment, performing the action at step 606 includes sending a recording of the meeting to the participants of the meeting based at least in part on the participants being automatically identified. For instance, the recording may include an audio recording and/or a video recording.

In some example embodiments, one or more steps 602, 604, and/or 606 of flowchart 600 may not be performed. Moreover, steps in addition to or in lieu of steps 602, 604, and/or 606 may be performed. For instance, in an example embodiment, the method of flowchart 600 further includes one or more of the steps shown in flowchart 300 of FIG. 3, though with the term "first participant" replaced with the term "designated participant."

In another example embodiment, the method of flowchart 600 further includes one or more of the steps shown in flowchart 400 of FIG. 4, though with the term "first participant" replaced with the term "designated participant." Proximity logic 924 and author determination logic 926 are operable in a manner similar to proximity determination logic 512 and author determination logic 514, respectively, shown in FIG. 5. Moreover, proximity information 948 includes information similar to proximity information 528 shown in FIG. 5.

In yet another example embodiment, the method of flowchart 200 further includes one or more of the steps shown in flowchart 700 of FIG. 7.

As shown in FIG. 7, the method of flowchart 700 begins at step 702. In step 702, avatars are generated for the respective participants of the meeting. In an example implementation, avatar logic 914 generates avatars 940 for the respective participants. For example, avatar logic 914 may generate the avatars 940 for the respective participants in response to (e.g., based on) receipt of the participant identifiers 938. In accordance with this example, avatar logic 914 may determine the participants for whom the avatars 940 are to be generated based on the participant identifiers 938.

At step 704, a video stream that is generated from at least a first portion of the 360-degree view and the avatars are combined to provide an updated video stream. In an example implementation, combination logic 916 combines a video stream 934 that is generated from at least a first portion of the 360-degree view 930 and the avatars 940 to provide an updated video stream 942. A 360-degree video camera may generate the video stream 934 from at least the first portion of the 360-degree view 930. For instance, the 360-degree video camera may be included in camera(s) 902. It will be recognized that camera(s) 902 need not necessarily capture the 360-degree view 930 and/or generate the video stream 934, as depicted by the dashed lines leading from camera(s) 902 in FIG. 9.

At step 706, the updated video stream is provided (e.g., sent) for presentation on a display of a computing device of a remote participant of the meeting who is not represented in the 360-degree view. In an example implementation, provision logic 918 provides the updated video stream 942 for presentation on the display of the computing device of the remote participant. For instance, provision logic 918 may include a transmitter that transmits the updated video stream 942 (e.g., via a network) to the computing device of the remote participant.

At step 708, a determination is made that the avatar of the designated participant is selected from the avatars in the updated video stream by the remote participant. In an example implementation, determination logic 920 determines that the avatar of the designated participant is selected from the avatars 940 in the updated video stream 942 by the remote participant. For example, determination logic 920 may make the determination in response to receipt of selection indicator(s) 936. In accordance with this example, the selection indicator(s) 936 (or a subset thereof) may be generated in response to the avatar of the designated participant being selected from the avatars 940 in the updated video stream 942. The selection indicator(s) 936 (or the subset thereof) may indicate that the avatar of the designated participant is selected from the avatars 940 in the updated video stream 942 (e.g., by the remote participant). Accordingly, determination logic 920 may determine that the avatar of the designated participant is selected from the avatars 940 in the updated video stream 942 by the remote participant based on the selection indicator(s) 936 (or the subset thereof) indicating that the avatar of the designated participant is selected from the avatars 940 in the updated video stream 942 by the remote participant. Determination logic 920 may generate a selection instruction 944 in response to making the determination. The selection instruction 944 may indicate that a video stream that corresponds to the designated participant is to be selected for presentation on the display of the computing device of the remote participant.

At step 710, a second video stream that corresponds to the designated participant is selected for presentation on the display of the computing device of the remote participant (e.g., in response to a determination that the avatar of the designated participant is selected). In an example implementation, selection logic 922 selects the second video stream that corresponds to the designated participant for presentation on the display of the computing device of the remote participant. For example, selection logic 922 may select the second video stream in response to receipt of the selection instruction 944. In accordance with this example, selection logic 922 may select the second video stream based on the selection instruction 944 indicating that a video stream that corresponds to the designated participant is to be selected for presentation on the display of the computing device of the remote participant. Selection logic 922 may generate a provision instruction 946 to indicate that the second video stream is to be provided (e.g., in lieu of the updated video stream 942) for presentation on the display of the computing device of the remote participant.

At step 712, the second video stream is provided in lieu of the updated video stream for presentation on the display of the computing device of the remote participant (e.g., in response to the determination that the avatar of the designated participant is selected by the remote participant). In an example implementation, provision logic 918 provides the second video stream in lieu of the updated video stream 942 for presentation on the display of the computing device of the remote participant. For example, provision logic 918 may provide the second video stream in lieu of the updated video stream 942 for presentation on the display of the computing device of the remote participant in response to receipt of the provision instruction 946. In accordance with this example, provision logic 918 may provide the second video stream in lieu of the updated video stream 942 for presentation on the display of the computing device of the remote participant based on the provision instruction 946 indicating that the second video stream is to be provided (e.g., in lieu of the updated video stream 942) for presentation on the display of the computing device of the remote participant.

In still another example embodiment, the method of flowchart 200 further includes one or more of the steps shown in flowchart 800 of FIG. 8.

As shown in FIG. 8, the method of flowchart 800 begins at step 802. In step 802, a video stream that is generated from at least a first portion of the 360-degree view is provided for presentation on a display of a computing device of a remote participant of the meeting who is not represented in the 360-degree view. In an example implementation, provision logic 918 provides a video stream 934 that is generated from at least a first portion of the 360-degree view 930 for presentation on the display of a computing device of a remote participant of the meeting who is not represented in the 360-degree view 930. For instance, provision logic 918 may include a transmitter that transmits the video stream 934 (e.g., via a network) to the computing device of the remote participant.

At step 804, a determination is made that a representation of the designated participant in the video stream is selected by the remote participant. In an example implementation, determination logic 920 determines that a representation of the designated participant in the video stream 934 is selected by the remote participant. For example, determination logic 920 may make the determination in response to receipt of selection indicator(s) 936. In accordance with this example, the selection indicator(s) 936 (or a subset thereof) may be generated in response to the representation of the designated participant in the video stream 934 being selected. The selection indicator(s) 936 (or the subset thereof) may indicate that the representation of the designated participant in the video stream 934 is selected (e.g., by the remote participant). Accordingly, determination logic 920 may determine that the representation of the designated participant in the video stream 934 is selected by the remote participant based on the selection indicator(s) 936 (or the subset thereof) indicating that the representation of the designated participant in the video stream 934 is selected by the remote participant. Determination logic 920 may generate an incorporation instruction 952 in response to making the determination. The incorporation instruction 952 may indicate that information regarding the designated participant is to be incorporated into the video stream 934.

At step 806, information regarding the designated participant is incorporated into the video stream to provide an updated video stream for presentation on the display of the computing device of the remote participant (e.g., in response to a determination that the representation of the designated participant in the video stream is selected by the remote participant). For example, the information may include textual information. In another example, the information may indicate a role of the designated participant with regard to a project, a position of the designated participant within an organization, and/or a name of the designated participant. In an example implementation, combination logic 916 incorporates the information regarding the designated participant into the video stream 934 to provide the updated video stream 942 for presentation on the display of the computing device of the remote participant. For example, combination logic 916 may incorporate the information regarding the designated participant into the video stream 934 to provide the updated video stream 942 in response to receipt of the incorporation instruction 952. In accordance with this example, combination logic 916 may incorporate the information regarding the designated participant into the video stream 934 to provide the updated video stream 942 based on the incorporation instruction 952 indicating that the information regarding the designated participant is to be incorporated into the video stream 934.

In an aspect of this embodiment, comparing the image of the designated participant in the 360-degree view to the identification information regarding the designated participant at step 604 may be performed in response to the determination that the representation of the designated participant in the video stream is selected by the remote participant.

It will be recognized that computing device(s) 900 may not include one or more of camera(s) 902, identification-based performance logic 904, store 906, identification logic 908, recognition logic 910, action logic 912, avatar logic 914, combination logic 916, provision logic 918, determination logic 920, selection logic 922, proximity logic 924, author determination logic 926, and/or comparison logic 928. Furthermore, computing device(s) 900 may include components in addition to or in lieu of camera(s) 902, identification-based performance logic 904, store 906, identification logic 908, recognition logic 910, action logic 912, avatar logic 914, combination logic 916, provision logic 918, determination logic 920, selection logic 922, proximity logic 924, author determination logic 926, and/or comparison logic 928.

Any one or more of remote identification-based performance logic 128A-128N, local identification-based performance logic 118, identification-based performance logic 504, identification logic 508, action logic 510, proximity determination logic 512, author determination logic 514, storing logic 516, detection logic 518, matching logic 520, identification-based performance logic 904, identification logic 908, recognition logic 910, action logic 912, avatar logic 914, combination logic 916, provision logic 918, determination logic 920, selection logic 922, proximity logic 924, author determination logic 926, comparison logic 928, flowchart 200, flowchart 300, flowchart 400, flowchart 600, flowchart 700, and/or flowchart 800 may be implemented in hardware, software, firmware, or any combination thereof.

For example, any one or more of remote identification-based performance logic 128A-128N, local identification-based performance logic 118, identification-based performance logic 504, identification logic 508, action logic 510, proximity determination logic 512, author determination logic 514, storing logic 516, detection logic 518, matching logic 520, identification-based performance logic 904, identification logic 908, recognition logic 910, action logic 912, avatar logic 914, combination logic 916, provision logic 918, determination logic 920, selection logic 922, proximity logic 924, author determination logic 926, comparison logic 928, flowchart 200, flowchart 300, flowchart 400, flowchart 600, flowchart 700, and/or flowchart 800 may be implemented, at least in part, as computer program code configured to be executed in one or more processors.

In another example, any one or more of remote identification-based performance logic 128A-128N, local identification-based performance logic 118, identification-based performance logic 504, identification logic 508, action logic 510, proximity determination logic 512, author determination logic 514, storing logic 516, detection logic 518, matching logic 520, identification-based performance logic 904, identification logic 908, recognition logic 910, action logic 912, avatar logic 914, combination logic 916, provision logic 918, determination logic 920, selection logic 922, proximity logic 924, author determination logic 926, comparison logic 928, flowchart 200, flowchart 300, flowchart 400, flowchart 600, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of performing an action based on automatic identification of participants of a meeting, the participants of the meeting in a 360-degree view of an environment that is captured by a 360-degree video camera are automatically identified, using at least one element that includes at least one of (a) one or more processors, (b) physical hardware, or (c) electrical circuitry, independently from an invitee list for the meeting that indicates people who are invited to the meeting. The action is performed with regard to the participants of the meeting, using the at least one element, based at least in part on the participants being automatically identified independently from the invitee list.

In a first aspect of the first example method, automatically identifying the participants comprises detecting signals from respective mobile devices that are associated with the respective participants of the meeting. In accordance with the first aspect, automatically identifying the participants further comprises matching the signals to the respective participants to automatically identify the respective participants.

In a second aspect of the first example method, the first example method further comprises storing identification information in a store. The identification information describes facial features of a plurality of people. The plurality of people includes a designated participant of the meeting. In accordance with the second aspect, automatically identifying the participants comprises detecting facial features of the designated participant in the 360-degree view of the environment. In further accordance with the second aspect, automatically identifying the participants further comprises matching the facial features of the designated participant that are detected in the 360-degree view to the identification information that describes the facial features of the designated participant to automatically identify the designated participant. The second aspect of the first example method may be implemented in combination with the first aspect of the first example method, though the example embodiments are not limited in this respect.

In a third aspect of the first example method, the first example method further comprises storing identification information in a store. The identification information includes a fingerprint of a designated participant of the meeting. In accordance with the third aspect, automatically identifying the participants comprises receiving a fingerprint that is captured by a camera included in a mobile device of the designated participant at initiation of the meeting. In further accordance with the third aspect, automatically identifying the participants further comprises matching the fingerprint of the designated participant that is stored in the store with the fingerprint that is captured by the camera included in the mobile device of the designated participant to automatically identify the designated participant. The third aspect of the first example method may be implemented in combination with the first and/or second aspect of the first example method, though the example embodiments are not limited in this respect In a fourth aspect of the first example method, the first example method further comprises storing identification information in a store. The identification information includes an eye scan of a designated participant of the meeting. In accordance with the fourth aspect, automatically identifying the participants comprises receiving an eye scan that is captured by a camera included in a mobile device of the designated participant at initiation of the meeting. In further accordance with the fourth aspect, automatically identifying the participants further comprises matching the eye scan of the designated participant that is stored in the store with the eye scan that is captured by the camera included in the mobile device of the designated participant to automatically identify the designated participant. The fourth aspect of the first example method may be implemented in combination with the first, second, and/or third aspect of the first example method, though the example embodiments are not limited in this respect.

In a fifth aspect of the first example method, the first example method further comprises storing identification information in a store. The identification information includes an electrocardiogram of a designated participant of the meeting. In accordance with the fifth aspect, automatically identifying the participants comprises receiving an electrocardiogram that is captured by a sensor included in a mobile device of the designated participant at initiation of the meeting. In further accordance with the fifth aspect, automatically identifying the participants further comprises matching the electrocardiogram of the participant that is stored in the store with the electrocardiogram that is captured by the sensor included in the mobile device of the designated participant to automatically identify the designated participant. The fifth aspect of the first example method may be implemented in combination with the first, second, third, and/or fourth aspect of the first example method, though the example embodiments are not limited in this respect.

In a sixth aspect of the first example method, automatically identifying the participants of the meeting comprises automatically identifying a first participant of the meeting. In accordance with the sixth aspect, automatically identifying the participants of the meeting further comprises automatically identifying a second participant of the meeting. In further accordance with the sixth aspect, the first example method further comprises determining that the first participant is within a first proximity of a first object as first content is provided via the first object in response to automatically identifying the first participant. In further accordance with the sixth aspect, the first example method further comprises determining that the first participant is an author of the first content based on a determination that the first participant is within the first proximity of the first object as the first content is provided via the first object. In further accordance with the sixth aspect, the first example method further comprises determining that the second participant is within a second proximity of a second object as second content is provided via the second object in response to automatically identifying the second participant. In further accordance with the sixth aspect, the first example method further comprises determining that the second participant is an author of the second content based on a determination that the second participant is within the second proximity of the second object as the second content is provided via the second object. The sixth aspect of the first example method may be implemented in combination with the first, second, third, fourth, and/or fifth aspect of the first example method, though the example embodiments are not limited in this respect.

In a seventh aspect of the first example method, automatically identifying the participants of the meeting comprises automatically identifying a first participant of the meeting. In accordance with the seventh aspect, automatically identifying the participants of the meeting further comprises automatically identifying a second participant of the meeting. In further accordance with the seventh aspect, the first example method further comprises determining that the first participant is closer than others of the participants to an object as a first plurality of portions of a collaborative image are generated on an object at a first plurality of respective time instances in response to automatically identifying the first participant. In further accordance with the seventh aspect, the first example method further comprises determining that the first participant is an author of the first plurality of portions of the collaborative image based on a determination that the first participant is closer than others of the participants to the object as the first plurality of portions of the collaborative image are generated on the object. In further accordance with the seventh aspect, the first example method further comprises determining that the second participant is closer than others of the participants to the object as a second plurality of portions of the collaborative image are generated on the object at a second plurality of respective time instances in response to automatically identifying the second participant. In further accordance with the seventh aspect, the first example method further comprises determining that the second participant is an author of the second plurality of portions of the collaborative image based on a determination that the second participant is closer than others of the participants to the object as the second plurality of portions of the collaborative image are generated on the object. The seventh aspect of the first example method may be implemented in combination with the first, second, third, fourth, fifth, and/or sixth aspect of the first example method, though the example embodiments are not limited in this respect.

In an eighth aspect of the first example method, performing the action comprises sending a message to the participants of the meeting based at least in part on the participants being automatically identified. The eighth aspect of the first example method may be implemented in combination with the first, second, third, fourth, fifth, sixth, and/or seventh aspect of the first example method, though the example embodiments are not limited in this respect.

In a ninth aspect of the first example method, performing the action comprises sending a recording of the meeting to the participants of the meeting based at least in part on the participants being automatically identified. The ninth aspect of the first example method may be implemented in combination with the first, second, third, fourth, fifth, sixth, seventh, and/or eighth aspect of the first example method, though the example embodiments are not limited in this respect.

In a second example method of performing an action based on automatic identification of participants of a meeting, it is recognized that a designated participant of the meeting is not indicated by an invitee list for the meeting, using at least one element that includes at least one of (a) one or more processors, (b) physical hardware, or (c) electrical circuitry. The invitee list indicates people who are invited to the meeting. The participants of the meeting are automatically identified in a 360-degree view of an environment that is captured by a 360-degree video camera, using the at least one element. Automatically identifying the participants of the meeting comprises comparing an image of the designated participant in the 360-degree view to identification information regarding the designated participant that is stored in a store to automatically identify the designated participant. The action is performed with regard to the participants of the meeting, including the designated participant, based at least in part on the participants being automatically identified.

In a first aspect of the second example method, the second example method further comprises generating avatars for the respective participants of the meeting. In accordance with the first aspect, the second example method further comprises combining a video stream that is generated from at least a first portion of the 360-degree view and the avatars to provide an updated video stream. In further accordance with the first aspect, the second example method further comprises providing the updated video stream for presentation on a display of a computing device of a remote participant of the meeting who is not represented in the 360-degree view. In further accordance with the first aspect, the second example method further comprises determining that the avatar of the designated participant is selected from the avatars in the updated video stream by the remote participant. In further accordance with the first aspect, the second example method further comprises selecting a second video stream that corresponds to the designated participant for presentation on the display of the computing device of the remote participant in response to a determination that the avatar of the designated participant is selected.

In a second aspect of the second example method, the second example method further comprises providing the second video stream in lieu of the updated video stream for presentation on the display of the computing device of the remote participant in response to the determination that the avatar of the designated participant is selected by the remote participant. The second aspect of the second example method may be implemented in combination with the first aspect of the second example method, though the example embodiments are not limited in this respect.

In a third aspect of the second example method, the second example method further comprises providing a video stream that is generated from at least a first portion of the 360-degree view for presentation on a display of a computing device of a remote participant of the meeting who is not represented in the 360-degree view. In accordance with the third aspect, the second example method further comprises determining that a representation of the designated participant in the video stream is selected by the remote participant. In accordance with the third aspect, the second example method further comprises incorporating information regarding the designated participant into the video stream to provide an updated video stream for presentation on the display of the computing device of the remote participant in response to a determination that the representation of the designated participant in the video stream is selected by the remote participant. The third aspect of the second example method may be implemented in combination with the first and/or second aspect of the second example method, though the example embodiments are not limited in this respect In a fourth aspect of the second example method, comparing the image of the designated participant in the 360-degree view to the identification information regarding the designated participant comprises comparing the image of the designated participant in the 360-degree view to the identification information regarding the designated participant in response to the determination that the representation of the designated participant in the video stream is selected by the remote participant. The fourth aspect of the second example method may be implemented in combination with the first, second, and/or third aspect of the second example method, though the example embodiments are not limited in this respect.

In a fifth aspect of the second example method, the second example method further comprises determining that the designated participant is within a first proximity of a first object as first content is provided via the first object in response to automatically identifying the designated participant. In accordance with the fifth aspect, the second example method further comprises determining that the designated participant is an author of the first content based on a determination that the designated participant is within the first proximity of the first object as the first content is provided via the first object. The fifth aspect of the second example method may be implemented in combination with the first, second, third, and/or fourth aspect of the second example method, though the example embodiments are not limited in this respect.

In a sixth aspect of the second example method, the second example method further comprises determining that the designated participant is closer than others of the participants to an object as a first plurality of portions of a collaborative image are generated on an object at a first plurality of respective time instances in response to automatically identifying the designated participant. In accordance with the sixth aspect, the second example method further comprises determining that the designated participant is an author of the first plurality of portions of the collaborative image based on a determination that the designated participant is closer than others of the participants to the object as the first plurality of portions of the collaborative image are generated on the object. In further accordance with the sixth aspect, the second example method further comprises determining that a second participant is closer than others of the participants to the object as a second plurality of portions of the collaborative image are generated on the object at a second plurality of respective time instances in response to automatically identifying the second participant. In further accordance with the sixth aspect, the second example method further comprises determining that the second participant is an author of the second plurality of portions of the collaborative image based on a determination that the second participant is closer than others of the participants to the object as the second plurality of portions of the collaborative image are generated on the object. The sixth aspect of the second example method may be implemented in combination with the first, second, third, fourth, and/or fifth aspect of the second example method, though the example embodiments are not limited in this respect.

In a seventh aspect of the second example method, performing the action comprises sending a message to the participants of the meeting based at least in part on the participants being automatically identified. The seventh aspect of the second example method may be implemented in combination with the first, second, third, fourth, fifth, and/or sixth aspect of the second example method, though the example embodiments are not limited in this respect.

In an eighth aspect of the second example method, performing the action comprises sending a recording of the meeting to the participants of the meeting based at least in part on the participants being automatically identified. The eighth aspect of the second example method may be implemented in combination with the first, second, third, fourth, fifth, sixth, and/or seventh aspect of the second example method, though the example embodiments are not limited in this respect.

A first example system to perform an action based on automatic identification of participants of a meeting comprises at least one element including at least one of (a) one or more processors, (b) physical hardware, or (c) electrical circuitry. The first example system further comprises identification logic, implemented using the at least one element, configured to automatically identify the participants of the meeting in a 360-degree view of an environment that is captured by a 360-degree video camera independently from an invitee list for the meeting, the invitee list indicating people who are invited to the meeting. The first example system further comprises action logic, implemented using the at least one element, configured to perform the action with regard to the participants of the meeting based at least in part on the participants being automatically identified independently from the invitee list.

In a first aspect of the first example system, the identification logic comprises detection logic configured to detect signals from respective mobile devices that are associated with the respective participants of the meeting. In accordance with the first aspect, the identification logic further comprises matching logic configured to match the signals to the respective participants to automatically identify the respective participants.

In a second aspect of the first example system, the first example system further comprises storing logic configured to store identification information in a store. The identification information describes facial features of a plurality of people. The plurality of people includes a designated participant of the meeting. In accordance with the second aspect, the identification logic comprises detection logic configured to detect facial features of the designated participant in the 360-degree view of the environment. In further accordance with the second aspect, the identification logic further comprises matching logic configured to match the facial features of the designated participant that are detected in the 360-degree view to the identification information that describes the facial features of the designated participant to automatically identify the designated participant. The second aspect of the first example system may be implemented in combination with the first aspect of the first example system, though the example embodiments are not limited in this respect.

In a third aspect of the first example system, the first example system further comprises storing logic configured to store identification information in a store. The identification information includes a fingerprint of a designated participant of the meeting. In accordance with the third aspect, the identification logic comprises matching logic configured to match the fingerprint of the designated participant that is stored in the store with a fingerprint that is captured by a camera included in a mobile device of the designated participant at initiation of the meeting to automatically identify the designated participant. The third aspect of the first example system may be implemented in combination with the first and/or second aspect of the first example system, though the example embodiments are not limited in this respect.

In a fourth aspect of the first example system, the first example system further comprises storing logic configured to store identification information in a store. The identification information includes an eye scan of a designated participant of the meeting. In accordance with the fourth aspect, the identification logic comprises matching logic configured to match the eye scan of the designated participant that is stored in the store with an eye scan that is captured by a camera included in a mobile device of the designated participant at initiation of the meeting to automatically identify the designated participant. The fourth aspect of the first example system may be implemented in combination with the first, second, and/or third aspect of the first example system, though the example embodiments are not limited in this respect.

In a fifth aspect of the first example system, the first example system further comprises storing logic configured to store identification information in a store. The identification information includes an electrocardiogram of a designated participant of the meeting. In accordance with the fifth aspect, the identification logic comprises matching logic configured to match the electrocardiogram of the designated participant that is stored in the store with an electrocardiogram that is captured by a sensor included in a mobile device of the designated participant at initiation of the meeting to automatically identify the designated participant. The fifth aspect of the first example system may be implemented in combination with the first, second, third, and/or fourth aspect of the first example system, though the example embodiments are not limited in this respect.

In a sixth aspect of the first example system, the participants of the meeting include a first participant and a second participant. In accordance with the sixth aspect, the first example system further comprises proximity determination logic configured to determine whether the first participant is within a first proximity of a first object as first content is provided via the first object in response to the first participant being automatically identified. The proximity determination logic is further configured to determining whether the second participant is within a second proximity of a second object as second content is provided via the second object in response to the second participant being automatically identified. In accordance with the sixth aspect, the first example system further comprises author determination logic configured to determine that the first participant is an author of the first content based on a determination that the first participant is within the first proximity of the first object as the first content is provided via the first object. The author determination logic is further configured to determine that the second participant is an author of the second content based on a determination that the second participant is within the second proximity of the second object as the second content is provided via the second object. The sixth aspect of the first example system may be implemented in combination with the first, second, third, fourth, and/or fifth aspect of the first example system, though the example embodiments are not limited in this respect.

In a seventh aspect of the first example system, the participants of the meeting include a first participant and a second participant. In accordance with the seventh aspect, the first example system further comprises proximity determination logic configured to determine which participant of the meeting is closer than others of the participants to an object at each of a plurality of time instances as a plurality of respective portions of a collaborative image are generated on an object in response to the participants being automatically identified, the plurality of time instances including a first plurality of time instances and a second plurality of time instances. The plurality of portions of the collaborative image includes a first plurality of portions that corresponds to the first plurality of respective time instances and a second plurality of portions that corresponds to the second plurality of respective time instances. In further accordance with the seventh aspect, the first example system further comprises author determination logic configured to determine that the first participant is an author of the first plurality of portions of the collaborative image based on a determination that the first participant is closer than others of the participants to the object as the first plurality of portions of the collaborative image are generated on the object. The author determination logic is further configured to determine that the second participant is an author of the second plurality of portions of the collaborative image based on a determination that the second participant is closer than others of the participants to the object as the second plurality of portions of the collaborative image are generated on the object. The seventh aspect of the first example system may be implemented in combination with the first, second, third, fourth, fifth, and/or sixth aspect of the first example system, though the example embodiments are not limited in this respect.

In an eighth aspect of the first example system, the action logic is configured to send a message to the participants of the meeting based at least in part on the participants being automatically identified. The eighth aspect of the first example system may be implemented in combination with the first, second, third, fourth, fifth, sixth, and/or seventh aspect of the first example system, though the example embodiments are not limited in this respect.

In a ninth aspect of the first example system, the action logic is configured to send a recording of the meeting to the participants of the meeting based at least in part on the participants being automatically identified. The ninth aspect of the first example system may be implemented in combination with the first, second, third, fourth, fifth, sixth, seventh, and/or eighth aspect of the first example system, though the example embodiments are not limited in this respect.

A second example system to perform an action based on automatic identification of participants of a meeting comprises at least one element including at least one of (a) one or more processors, (b) physical hardware, or (c) electrical circuitry. The second example system further comprises recognition logic, implemented using the at least one element, configured to recognize that a designated participant of the meeting is not indicated by an invitee list for the meeting. The invitee list indicates people who are invited to the meeting. The second example system further comprises identification logic, implemented using the at least one element, configured to automatically identify the participants of the meeting in a 360-degree view of an environment that is captured by a 360-degree video camera. The identification logic comprises comparison logic configured to compare an image of the designated participant in the 360-degree view to identification information regarding the designated participant that is stored in a store to automatically identify the designated participant. The second example system further comprises action logic, implemented using the at least one element, configured to perform the action with regard to the participants of the meeting, including the designated participant, based at least in part on the participants being automatically identified.

In a first aspect of the second example system, the second example system further comprises avatar logic configured to generate avatars for the respective participants of the meeting. In accordance with the first aspect, the second example system further comprises combination logic configured to combine a video stream that is generated from at least a first portion of the 360-degree view and the avatars to provide an updated video stream. In further accordance with the first aspect, the second example system further comprises provision logic configured to provide the updated video stream for presentation on a display of a computing device of a remote participant of the meeting who is not represented in the 360-degree view. In further accordance with the first aspect, the second example system further comprises determination logic configured to determine whether the avatar of the designated participant is selected from the avatars in the updated video stream by the remote participant. In further accordance with the first aspect, the second example system further comprises selection logic configured to select a second video stream that corresponds to the designated participant for presentation on the display of the computing device of the remote participant in response to a determination that the avatar of the designated participant is selected.

In an example of the first aspect of the second example system, the provision logic is configured to provide the second video stream in lieu of the updated video stream for presentation on the display of the computing device of the remote participant in response to the determination that the avatar of the designated participant is selected by the remote participant.

In a second aspect of the second example system, the second example system further comprises provision logic configured to provide a video stream that is generated from at least a first portion of the 360-degree view for presentation on a display of a computing device of a remote participant of the meeting who is not represented in the 360-degree view. In accordance with the second aspect, the second example system further comprises determination logic configured to determine whether a representation of the designated participant in the video stream is selected by the remote participant. In further accordance with the second aspect, the second example system further comprises combination logic configured to incorporate information regarding the designated participant into the video stream to provide an updated video stream for presentation on the display of the computing device of the remote participant in response to a determination that the representation of the designated participant in the video stream is selected by the remote participant. The second aspect of the second example system may be implemented in combination with the first aspect of the second example system, though the example embodiments are not limited in this respect.

In an example of the second aspect of the second example system, the comparison logic is configured to compare the image of the designated participant in the 360-degree view to the identification information regarding the designated participant in response to the determination that the representation of the designated participant in the video stream is selected by the remote participant.

In a third aspect of the second example system, the second example system further comprises proximity logic configured to determine whether the designated participant is within a first proximity of a first object as first content is provided via the first object in response to the designated participant being automatically identified. In accordance with the third aspect, the second example system further comprises author determination logic configured to determining that the designated participant is an author of the first content based on a determination that the designated participant is within the first proximity of the first object as the first content is provided via the first object. The third aspect of the second example system may be implemented in combination with the first and/or second aspect of the second example system, though the example embodiments are not limited in this respect.

In a fourth aspect of the second example system, the second example system further comprises proximity logic configured to determine which participant of the meeting is closer than others of the participants to an object at each of a plurality of time instances as a plurality of respective portions of a collaborative image are generated on an object in response to the participants being automatically identified. The plurality of time instances includes a first plurality of time instances and a second plurality of time instances.

The plurality of portions of the collaborative image includes a first plurality of portions that corresponds to the first plurality of respective time instances and a second plurality of portions that corresponds to the second plurality of respective time instances. In accordance with the fourth aspect, the second example system further comprises author determination logic configured to determining that the designated participant is an author of the first plurality of portions of the collaborative image based on a determination that the designated participant is closer than others of the participants to the object as the first plurality of portions of the collaborative image are generated on the object. The author determination logic is further configured to determine that the second participant is an author of the second plurality of portions of the collaborative image based on a determination that the second participant is closer than others of the participants to the object as the second plurality of portions of the collaborative image are generated on the object. The fourth aspect of the second example system may be implemented in combination with the first, second, and/or third aspect of the second example system, though the example embodiments are not limited in this respect.

In a fifth aspect of the second example system, the action logic is configured to send a message to the participants of the meeting based at least in part on the participants being automatically identified. The fifth aspect of the second example system may be implemented in combination with the first, second, third, and/or fourth aspect of the second example system, though the example embodiments are not limited in this respect.

In a sixth aspect of the second example system, the action logic is configured to send a recording of the meeting to the participants of the meeting based at least in part on the participants being automatically identified. The sixth aspect of the second example system may be implemented in combination with the first, second, third, fourth, and/or fifth aspect of the second example system, though the example embodiments are not limited in this respect.

A first example computer program product comprises a computer-readable storage medium having computer program logic recorded thereon for enabling a processor-based system to perform an action based on automatic identification of participants of a meeting. The computer program logic comprises first program logic for enabling the processor-based system to automatically identify the participants of the meeting in a 360-degree view of an environment, which is captured by a 360-degree video camera, independently from an invitee list for the meeting. The invitee list indicates people who are invited to the meeting. The computer program logic further comprises second program logic for enabling the processor-based system to perform the action with regard to the participants of the meeting based at least in part on the participants being automatically identified independently from the invitee list.

A second example computer program product comprises a computer-readable storage medium having computer program logic recorded thereon for enabling a processor-based system to perform an action based on automatic identification of participants of a meeting. The computer program logic comprises first program logic for enabling the processor-based system to recognize that a designated participant of the meeting is not indicated by an invitee list for the meeting. The invitee list indicates people who are invited to the meeting. The computer program logic further comprises second program logic for enabling the processor-based system to automatically identify the participants of the meeting in a 360-degree view of an environment that is captured by a 360-degree video camera. The second program logic comprises logic for enabling the processor-based system to compare an image of the designated participant in the 360-degree view to identification information regarding the designated participant that is stored in a store to automatically identify the designated participant. The computer program logic further comprises third program logic for enabling the processor-based system to perform the action with regard to the participants of the meeting, including the designated participant, based at least in part on the participants being automatically identified.

IV. Example Computer System

Figure 10:
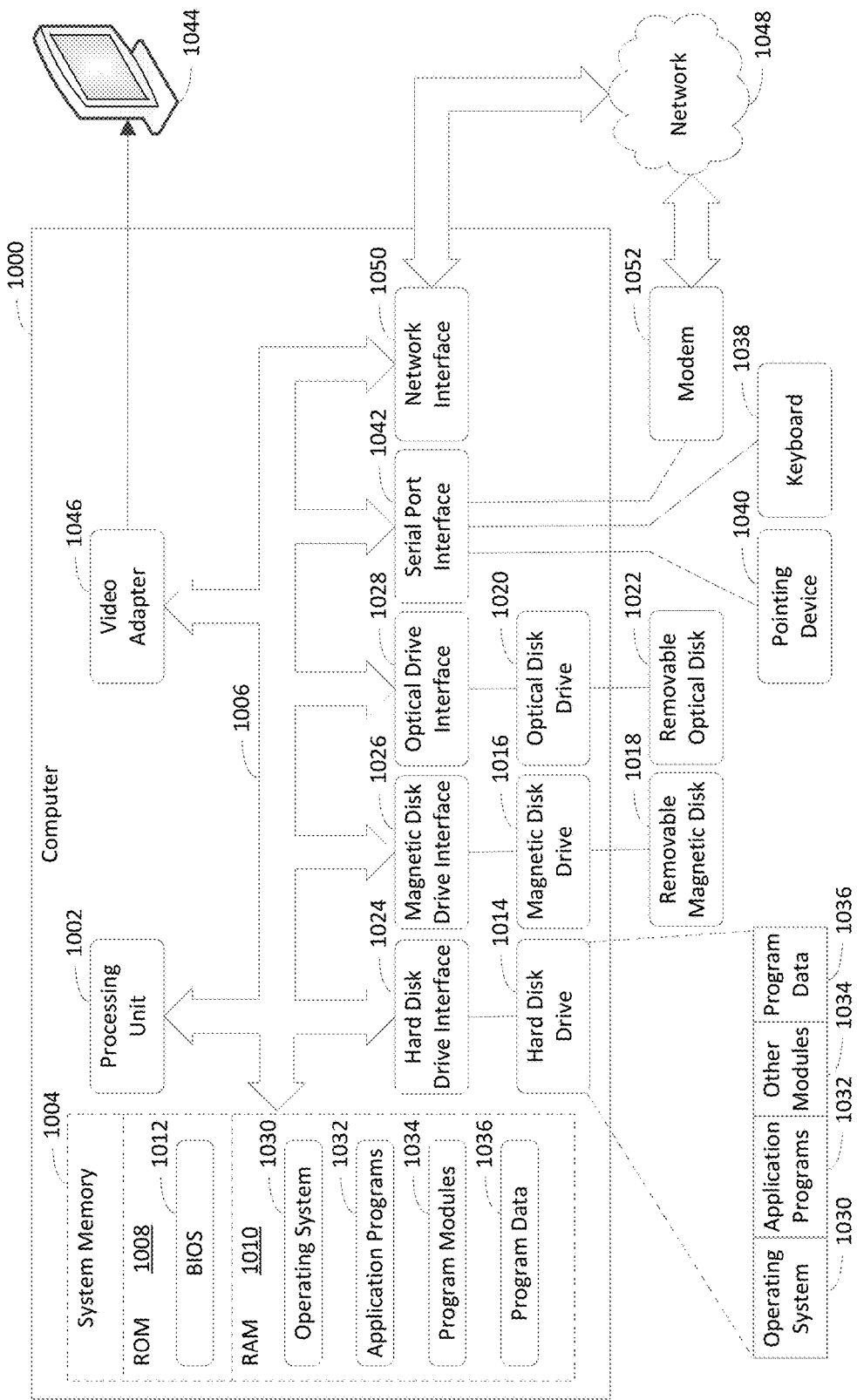
FIG. 10 depicts an example computer in which embodiments may be implemented.

FIG. 10 depicts an example computer 1000 in which embodiments may be implemented. Any one or more of computing devices 106A-106N and/or video conference device 102 shown in FIG. 1; any one or more of computing device(s) 500 shown in FIG. 5; and/or any one or more of computing device(s) 900 shown in FIG. 9 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of remote identification-based performance logic 128A-128N, local identification-based performance logic 118, identification-based performance logic 504, identification logic 508, action logic 510, proximity determination logic 512, author determination logic 514, storing logic 516, detection logic 518, matching logic 520, identification-based performance logic 904, identification logic 908, recognition logic 910, action logic 912, avatar logic 914, combination logic 916, provision logic 918, determination logic 920, selection logic 922, proximity logic 924, and author determination logic 926, comparison logic 928, flowchart 200 (including any step of flowchart 200), flowchart 300 (including any step of flowchart 300), flowchart 400 (including any step of flowchart 400), flowchart 600 (including any step of flowchart 600), flowchart 700 (including any step of flowchart 700), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   identification logic configured to automatically identify participants of a meeting in a view of an environment that is captured by a video camera;
   proximity determination logic configured to determine whether a first participant that is included in the participants is within a first proximity of a first object as first content is provided via the first object in response to the first participant being automatically identified; and
   author determination logic configured to determine that the first participant is an author of the first content based at least in part on a determination that the first participant is within the first proximity of the first object as the first content is provided via the first object.

2. The system of claim 1, wherein the identification logic comprises:
   detection logic configured to detect signals from respective mobile devices that are associated with the respective participants of the meeting; and
   matching logic configured to match the signals to the respective participants to automatically identify the respective participants.

3. The system of claim 1, further comprising:
   storing logic configured to store identification information in a store, the identification information describing facial features of people, the people including a designated participant of the meeting;
   wherein the identification logic comprises:
      detection logic configured to detect facial features of the designated participant in the view of the environment; and
      matching logic configured to match the facial features of the designated participant that are detected in the view to the identification information that describes the facial features of the designated participant to automatically identify the designated participant.

4. The system of claim 1, further comprising:
storing logic configured to store identification information in a store, the identification information including a fingerprint of a designated participant of the meeting;
wherein the identification logic comprises:
matching logic configured to match the fingerprint of the designated participant that is stored in the store with a fingerprint that is captured by a camera included in a mobile device of the designated participant at initiation of the meeting to automatically identify the designated participant.

5. The system of claim 1, further comprising:
storing logic configured to store identification information in a store, the identification information including an eye scan of a designated participant of the meeting;
wherein the identification logic comprises:
matching logic configured to match the eye scan of the designated participant that is stored in the store with an eye scan that is captured by a camera included in a mobile device of the designated participant at initiation of the meeting to automatically identify the designated participant.

6. The system of claim 1, further comprising:
storing logic configured to store identification information in a store, the identification information including an electrocardiogram of a designated participant of the meeting;
wherein the identification logic comprises:
matching logic configured to match the electrocardiogram of the designated participant that is stored in the store with an electrocardiogram that is captured by a sensor included in a mobile device of the designated participant at initiation of the meeting to automatically identify the designated participant.

7. The system of claim 1, further comprising:
action logic configured to send a message to the participants following the meeting based at least in part on the participants being automatically identified.

8. The system of claim 1, further comprising:
action logic configured to send a recording of the meeting to the participants following the meeting based at least in part on the participants being automatically identified.

9. The system of claim 1, wherein the proximity determination logic is configured to determine whether a second participant that is included in the participants is within a second proximity of a second object as second content is provided via the second object in response to the second participant being automatically identified; and
wherein the author determination logic is configured to determine that the second participant is an author of the second content based at least in part on a determination that the second participant is within the second proximity of the second object as the second content is provided via the second object.

10. A method comprising:
automatically identifying participants of a meeting in a view of an environment, which is captured by a video camera, said automatically identifying the participants comprising:
automatically identifying a first participant of the meeting;
determining that the first participant is closer than others of the participants to an object as first portions of a collaborative image are generated on an object at respective first time instances in response to automatically identifying the first participant; and
determining that the first participant is an author of the first portions of the collaborative image based on a determination that the first participant is closer than others of the participants to the object as the first portions of the collaborative image are generated on the object.

11. The method of claim 10, wherein automatically identifying the participants of the meeting comprises:
automatically identifying a second participant of the meeting; and
wherein the method further comprises:
determining that the second participant is closer than others of the participants to the object as second portions of the collaborative image are generated on the object at respective second time instances in response to automatically identifying the second participant; and
determining that the second participant is an author of the second portions of the collaborative image based on a determination that the second participant is closer than others of the participants to the object as the second portions of the collaborative image are generated on the object.

12. The method of claim 10, wherein automatically identifying the participants of the meeting in the view comprises:
detecting signals from respective mobile devices that are associated with the respective participants of the meeting; and
matching attributes of the signals to identifiers associated with at least one of (a) the respective participants or (b) the mobile devices that are associated with the respective participants to automatically identify the respective participants,
each of the attributes including at least one of a frequency, an amplitude, a phase, or a modulation of the respective signal.

13. A system comprising:
recognition logic configured to recognize that a designated participant of a meeting is not indicated by an invitee list for the meeting, the invitee list indicating people who are invited to the meeting;
identification logic configured to automatically identify participants of the meeting in a 360-degree view of an environment that is captured by a 360-degree video camera;
provision logic configured to provide a video stream that is generated from at least a first portion of the 360-degree view for presentation on a display of a computing device of a remote participant of the meeting who is not represented in the 360-degree view;
determination logic configured to determine whether a representation of the designated participant in the video stream is selected by the remote participant and combination logic configured to incorporate information regarding the designated participant into the video stream to provide an updated video stream for presentation on the display of the computing device of the remote participant in response to a determination that the representation of the designated participant in the video stream is selected by the remote participant.

14. The system of claim 13, further comprising:
avatar logic configured to generate avatars for the respective participants of the meeting;
wherein the combination logic is configured to combine the avatars with the 360-degree view;

wherein the determination logic is configured to determine whether the avatar of the designated participant is selected from the avatars in the video stream by the remote participant; and wherein the system further comprises:
selection logic configured to select a second video stream that corresponds to the designated participant for presentation on the display of the computing device of the remote participant in response to a determination that the avatar of the designated participant is selected.

15. The system of claim 14, wherein the provision logic is configured to provide the second video stream in lieu of the updated video stream for presentation on the display of the computing device of the remote participant in response to the determination that the avatar of the designated participant is selected by the remote participant.

16. The system of claim 13, wherein the identification logic comprises:
comparison logic configured to compare an image of the designated participant in the 360-degree view to identification information regarding the designated participant in response to the determination that the representation of the designated participant in the video stream is selected by the remote participant.

17. The system of claim 13, further comprising:
proximity logic configured to determine whether the designated participant is within a first proximity of a first object as first content is provided via the first object in response to the designated participant being automatically identified; and
author determination logic configured to determine that the designated participant is an author of the first content based on a determination that the designated participant is within the first proximity of the first object as the first content is provided via the first object.

18. The system of claim 13, further comprising:
proximity logic configured to determine which participant of the meeting is closer than others of the participants to an object at each of a plurality of time instances as respective portions of a collaborative image are generated on an object in response to the participants being automatically identified, the plurality of time instances including first time instances and second time instances, the portions of the collaborative image including first portions that corresponds to the respective first time instances and second portions that corresponds to the respective second time instances; and
author determination logic configured to determining that the designated participant is an author of the first portions of the collaborative image based on a determination that the designated participant is closer than others of the participants to the object as the first portions of the collaborative image are generated on the object,
the author determination logic further configured to determine that a second participant is an author of the second portions of the collaborative image based on a determination that the second participant is closer than others of the participants to the object as the second portions of the collaborative image are generated on the object.

19. The system of claim 13, further comprising: action logic configured to send a message to the participants of the meeting following the meeting based at least in part on the participants being automatically identified.

20. The system of claim 13, further comprising: action logic configured to send a recording of the meeting to the participants of the meeting following the meeting based at least in part on the participants being automatically identified.

* * * * *